United States Patent
Talarico et al.

(10) Patent No.: US 12,532,338 B2
(45) Date of Patent: Jan. 20, 2026

(54) FURTHER ENHANCEMENTS TO ULTRA-RELIABLE LOW-LATENCY COMMUNICATION (URLLC) IN UNLICENSED SPECTRUM

(71) Applicant: Intel Corporation, Santa Clara, CA (US)

(72) Inventors: Salvatore Talarico, Sunnyvale, CA (US); Yi Wang, Beijing (CN); Sergey Panteleev, Kildare (IE); Debdeep Chatterjee, San Jose, CA (US); Toufiqul Islam, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 389 days.

(21) Appl. No.: 18/094,567

(22) Filed: Jan. 9, 2023

(65) Prior Publication Data

US 2023/0164820 A1     May 25, 2023

Related U.S. Application Data

(60) Provisional application No. 63/308,760, filed on Feb. 10, 2022, provisional application No. 63/298,095, filed on Jan. 10, 2022.

(51) Int. Cl.
*H04W 72/512* (2023.01)
*H04W 74/0808* (2024.01)

(52) U.S. Cl.
CPC ..... *H04W 72/512* (2023.01); *H04W 74/0808* (2013.01)

(58) Field of Classification Search
CPC .................................................... H04W 72/12
USPC ........................................................ 370/329
See application file for complete search history.

(56) References Cited

PUBLICATIONS

ETSI, "5 GHz TLAN; Harmonised Standard covering the essential requirements of article 3.2 of Directive 2014/53/EU," ETSI EN 301 893 V2.1.1 (May 2017), 122 pages.

*Primary Examiner* — Angel T Brockman
(74) *Attorney, Agent, or Firm* — Gray Ice Higdon, PLLC

(57) ABSTRACT

Various embodiments herein provide techniques related to methods or techniques to be performed by a user equipment (UE). In some embodiments, a technique may include identifying that a failure of a listen-before-talk (LBT) procedure is related to alignment with a u-FFP. The technique may further include notifying, based on the identification, a higher layer about the failure of the LBT procedure. Other embodiments may be described and/or claimed.

20 Claims, 11 Drawing Sheets

FURTHER ENHANCEMENTS TO ULTRA-RELIABLE LOW-LATENCY COMMUNICATION (URLLC) IN UNLICENSED SPECTRUM

CROSS REFERENCE TO RELATED APPLICATION

The present application claims priority to U.S. Provisional Patent Application No. 63/298,095, which was filed Jan. 10, 2022; U.S. Provisional Patent Application No. 63/308,760, which was filed Feb. 10, 2022; the disclosures of which are hereby incorporated by reference.

FIELD

Various embodiments generally may relate to the field of wireless communications. For example, some embodiments may relate to ultra-reliable low-latency communication (URLLC) in the unlicensed spectrum.

BACKGROUND

Various embodiments generally may relate to the field of wireless communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
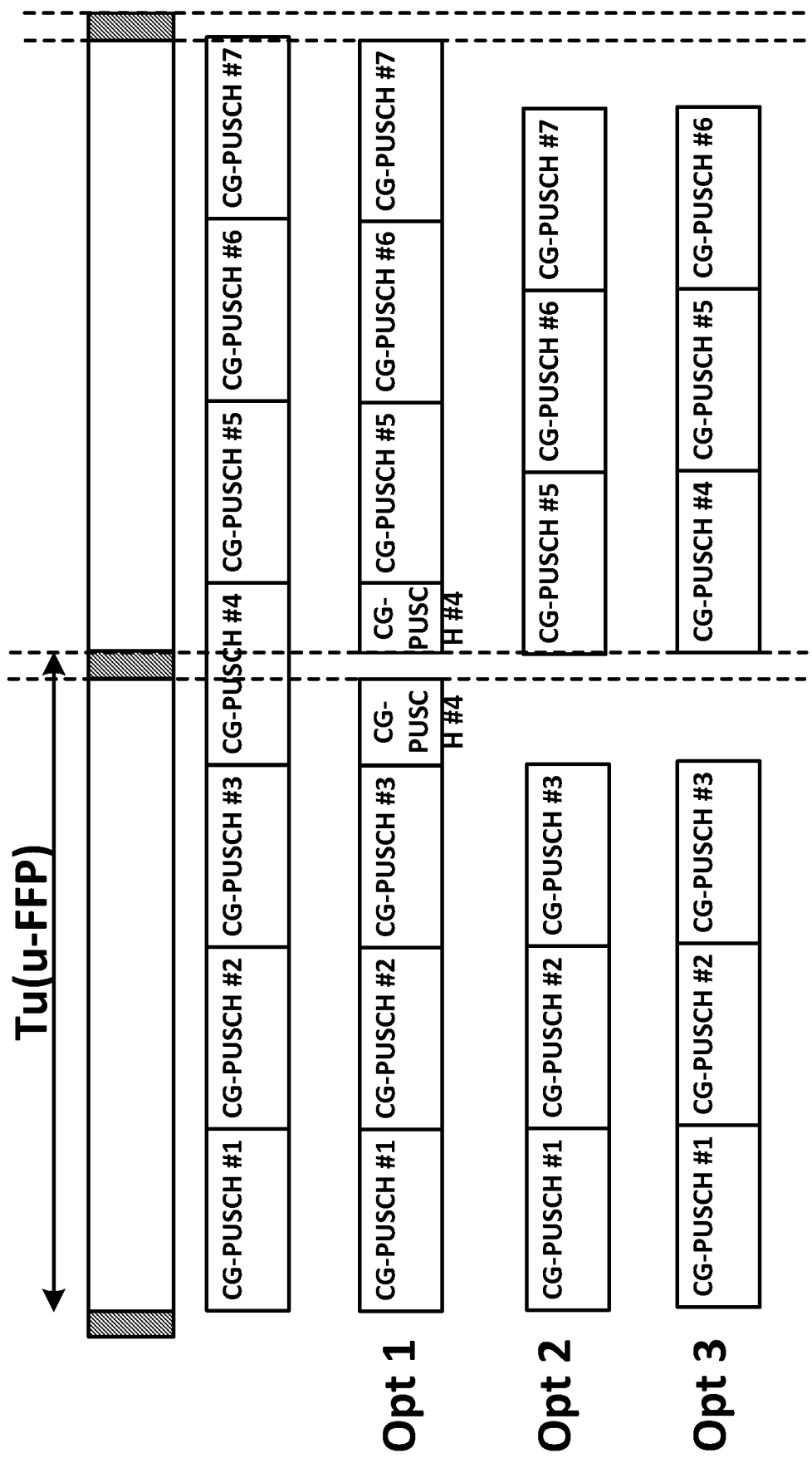
FIG. 1 illustrates an example user equipment (UE) transmission burst, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

The achievable latency and reliability performance of new radio (NR) may support use cases with tighter requirements. In order to extend the NR applicability in various verticals, third generation partnership project (3GPP) Release 16 (Rel-16 or Rel.16 or Rel. 16) NR has evolved to support use cases including the following:

3GPP Release 15 (Rel-15 or Rel.15 or Rel. 15) enabled use case improvements such as augmented reality (AR), virtual reality (VR), or other entertainment industry use cases New Release 16 use cases with higher requirements such as:
Factory automation
Transport Industry
Electrical Power Distribution However, in some of the scenarios listed above, one limiting factor may be the availability in spectrum. To mitigate this, one of the objectives of 3GPP Release-17 (Rel-17 or Rel.17 or Rel. 17) is to identify potential enhancements to ensure Release 16 feature compatibility with unlicensed band ultra-reliable low-latency communication (URLLC)/industrial internet of things (IIoT) operation in controlled environments. In this matter, it may be desirable to identify aspects of the design that can be enhanced when operating in unlicensed spectrum.

However, typically, such a system may be required to comply with the regulatory requirements dictated for the sub-6 gigahertz (GHz) band, where a listen before talk (LBT) procedure may be performed in some parts of the world to acquire the medium before a transmission can occur. Such a LBT procedure may be similar to that described in the European Telecommunications Standards Institute (ETSI) document EN 301 893. However, it may still be desirable to be able to guarantee the requirements in terms of reliability and latency identified for the design of URLLC/IIoT to meet the aforementioned use cases. Additional design considerations may therefore be considered. In fact, when operating URLLC/IIoT in the unlicensed spectrum, due to the LBT procedure and its aleatory nature, additional latency and loss in reliability may be introduced depending on the medium contention when the LBT fails.

During the NR-unlicensed (NR-U) work item (WI), both a load based (LBE) and frame based (FBE) design have been adopted to accommodate for different scenarios and the use of the LBT procedure. However, for the FBE framework, in order to exemplify the NR-U design, it was agreed by 3GPP that only the NR NodeB (gNB) can be acting as an initiating device, and the starting positions of the fixed frame periods align with every even frame given that the fixed frame period (FFP) can be {1 millisecond (ms), 2 ms, 2.5 ms, 4 ms, 5 ms, 10 ms}. However, this mode of operation may lead to very long delays when an LBT failure occurs at the gNB at the beginning of a FFP, because in this case all of the downlink (DL) and uplink (UL) transmissions scheduled within that FFP may need to be postponed to the following FFP for which a gNB is able to succeed its LBT procedure. Given that URLLC/IIoT designs have emphasized meeting the stringent latency requirements described above, this mode of operation may need to be modified and the single point of failure at the gNB may need to be removed providing every device with more opportunities to be able to transmit and more importantly allowing every device to be able to operate as an initiating device and acquire their own channel occupancy time (COT).

For Rel. 17, when operating is semi-static channel access mode (a.k.a., FBE) and if ue-SemiStaticChannelAccessConfig is provided, both gNB and UE may operate as initiating device. In order to mitigate any ambiguity between a UE and a gNB regarding who will be operating as initiating or responding device, a specific framework has been established. However, in some specific cases the UE's behavior may not be fully defined, and some further additions to the legacy framework may be desirable. Among others, these are a few examples:

When a configured grant (CG) uplink (UL) transmission falls within a u-FFP $T_u$ and would end after its idle period, but the CG UL transmission still falls within a g-FFP $T_x$ and ends before its idle period, it is unclear/undefined in the legacy framework what the UE's behavior would be, and whether the UE would first check that the UE already operates as initiating device or the UE should directly perform DL presence detection and establish whether the gNB has initiated $T_x$, and it can operate as responding device.

When a scheduled UL transmission and the corresponding scheduling downlink control information (DCI) are confined within different resource block (RB) sets across different carriers, the UE's behavior may not be defined in the legacy framework, and so it may be unclear whether the UE should always fall the COT initiation assumption indicated in the DCI, or should follow a difference behavior.

Various embodiments are described herein to address one or more of the above-described issues.

Other embodiments described herein may relate to how the UE should behave when a nominal transmission overlaps with a set of symbols associated to the idle period of a g-FFP in case the UE shares the g-FFP, or associated to the idle period of a u-FFP in case the UE has assumed a UE's initiated COT. As an example, FIG. 1 shows an example of a case when a UE needs to transmit a burst composed of 8 configured grant (CG)-physical uplink shared channel (PUSCH) transmissions (this could include eight consecutive repetitions or generally eight consecutive transmissions of the same transport block (TB) or repetitions of different TBs in case of multi-TB transmission within a burst). In particular, FIG. 1 depicts an example case of when a UE is able to initiate two back-to-back u-FFPs and CG-PUSCH #4 overlaps with the UE's idle period. In this case, different possible options are illustrated: option 1 illustrates the case when segmentation is applied over a CG-PUSCH transmission overlapping with the UE's idle period, and the symbols overlapping with the idle period are considered invalid; options 2/3 illustrate the case when in similar conditions the entire overlapping CG-PUSCH will be dropped: for option 2 the UE's buffer is flashed, and CG-PUSCH #4 is lost, while for option 3 the UE postpones CG-PUSCH #4 and all other transmissions so that to be performed at the first transmission opportunity.

In this matter, in Rel.17, 3GPP agreed that for PUSCH repetition type B segmentation across an idle period overlapping with a nominal transmission would be applied. However, the legacy framework is unclear on whether this feature should be also applied when the cg-Retransmission-Timer is enabled and the Rel.16 NR-U PUSCH repetition scheme is used instead. In this matter, along this disclosure, are example details and possible options on how to enable segmentation across the idle period for the NR-U PUSCH repetition scheme.

To enable URLLC/IIoT design within the sub-6 gigahertz (GHz) band, some modifications may be required to some specific aspects of the design to ensure harmonization between the Rel.16 NR-U and Rel.16 URLLC design. Embodiments herein provide examples regarding on how the UE should behave when determining the channel occupancy time (COT) initiator assumptions and for the case when a nominal transmission may overlap with an idle period while NR-U repetition scheme is adopted.

Initiating COT Assessment Procedure for CG Uplink (UL) Transmissions

In Rel. 17, when a system operates in semi-static channel access mode a framework to allow a UE to determine the COT initiator has been defined, and the following general procedure has been established:

When a configured UL transmission is aligned with a u-FFP boundary and ends before the idle period of that UE FFP associated to the UE, If the transmission is confined within a gNB FFP before the idle period of that gNB FFP, and the UE has already determined that gNB is initiated that gNB FFP, UE assumes that the configured UL transmission corresponds to gNB-initiated COT. Otherwise, UE assumes that the configured UL transmission corresponds to UE-initiated COT;

However, when a configured UL transmission starts after a UE FFP boundary and ends before the idle period of that UE FFP associated to the UE:
If the UE has already initiated the UE FFP, then UE assumes that the configured UL transmission corresponds to UE-initiated COT;
Otherwise, if the transmission is confined within a gNB FFP before the idle period of that gNB FFP, and if the UE has already determined that gNB has initiated that gNB FFP, then UE assumes that the configured UL transmission corresponds to gNB-initiated COT.

Furthermore, 3GPP has agreed that in semi-static channel access mode, for a transmission burst that includes multiple transmissions, the associated COT-ownership for all transmissions in the transmission burst should be the same.

However, if a CG UL transmission falls within a u-FFP $T_u$ and would end after its idle period, but the CG UL transmission falls within a g-FFP $T_x$ and ends before its idle period, the outcome of the UE's initiating determination may be different based on whether the UE attempts to determine first whether the transmission should be performed as if the UE operates as a responding device, or whether the UE attempts first to determine whether is shall operate as an initiating device, and based on the assessment made a transmission may be even dropped.

Figure 2:
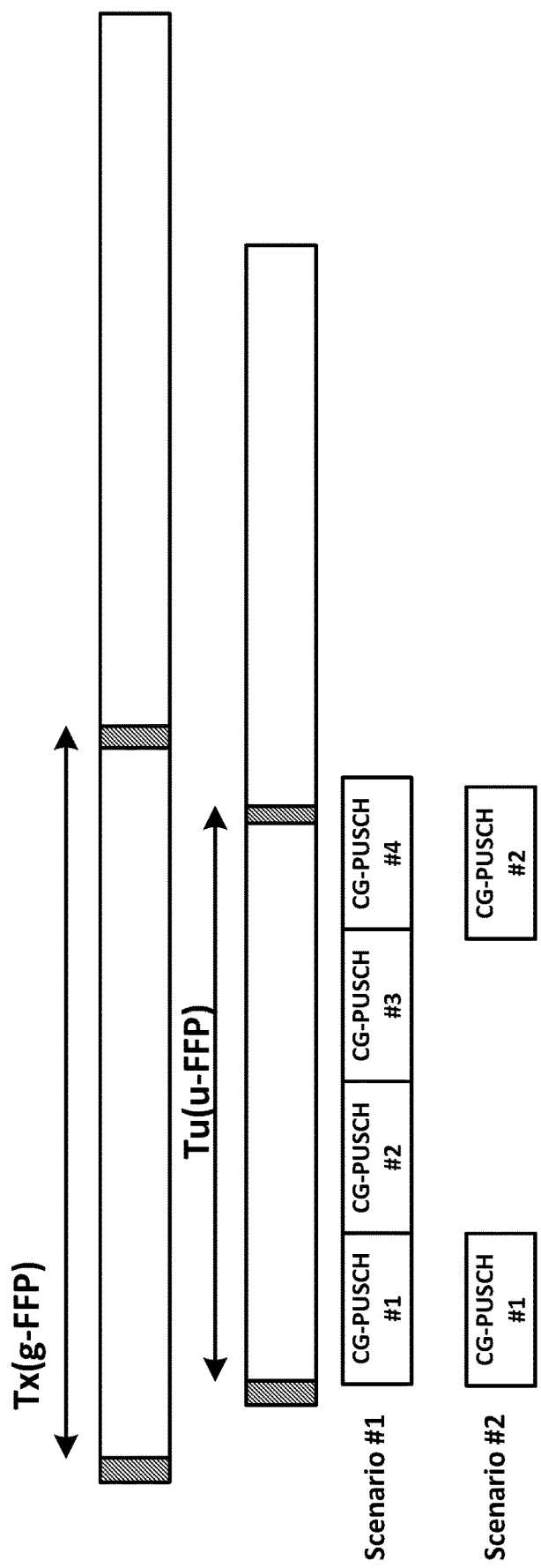
FIG. 2 illustrates an alternative example UE transmission burst, in accordance with various embodiments.
Figure 3:
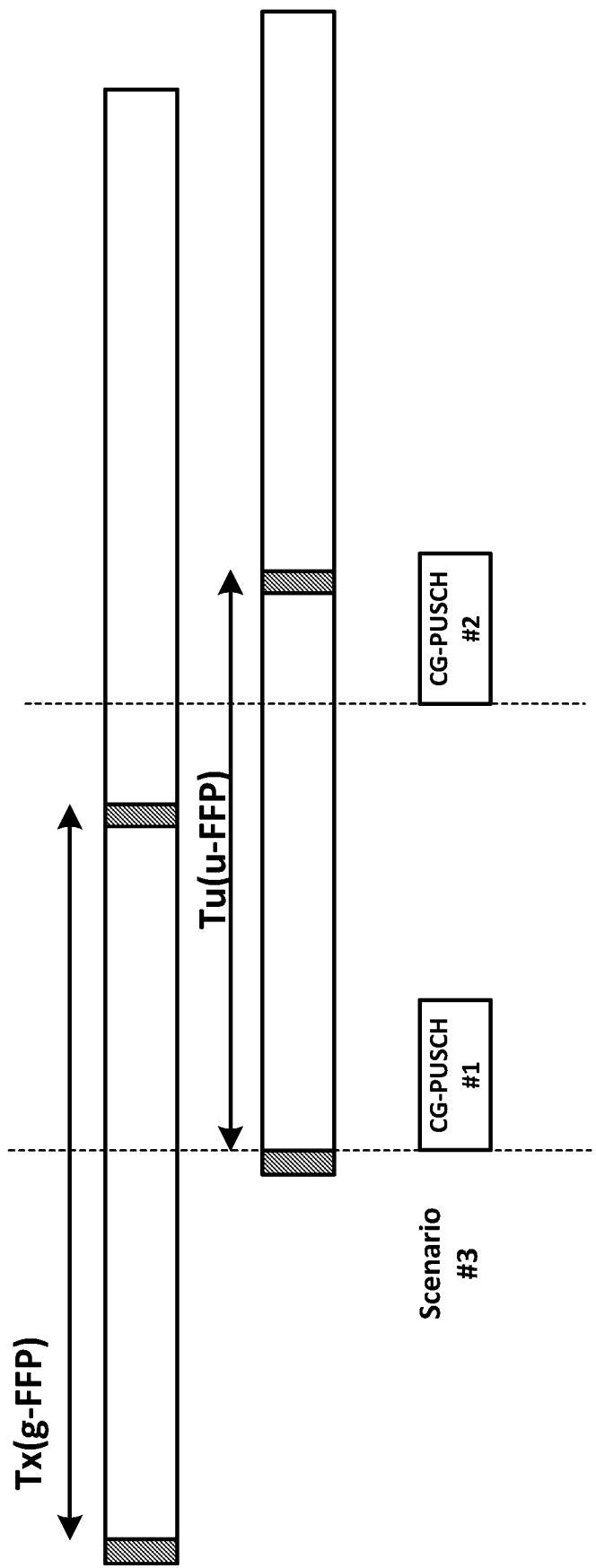
FIG. 3 illustrates an alternative example UE transmission burst, in accordance with various embodiments.

In this matter, FIG. 2 and FIG. 3 illustrate various examples.

FIG. 2—Illustration of two scenarios: 1) scenario #1 depicts an UL burst composed of multiple CG-PUSCH transmission where CG-PUSCH #4 overlaps with the u-FFP's idle period; 2) scenario #2 depicts the case when a UE initially acquires the u-FFP but a later CG-PUSCH transmission overlaps with the u-FFP's idle period.

FIG. 3—Illustration of a scenario depicting the case when a UE initially acquires the u-FFP but a later CG-PUSCH transmission overlaps with the u-FFP's idle period, which may belong to another u-FFP for which the UE may not have performed yet presence detection.

In the figures above three scenarios are depicted:

Scenario #1 (for example, as depicted in FIG. 2) illustrates the case when a CG UL transmission overlapping with the UE's idle period belongs to a contiguous burst. In this case, for each CG UL transmission of this burst the COT initiation assumption must be the same, and the CG UL transmission overlapping with the UE's idle period may only be unequivocally dropped if the UE assesses at the beginning of the burst whether it should operate as initiating device.

Scenario #2 (for example, as illustrated in FIG. 2) illustrates the case when a CG UL transmission overlapping with the UE's idle period does not belong to a burst containing a transmission which starts at the beginning of the u-FFP. In this case, the outcome of the transmission may be different and ambiguously defined based on the UE's behavior. For example, if the UE has already determined that it shall operate as an initiating device within a u-FFP where the CG PUSCH transmission overlapping with the UE's idle period lies, then this CG PUSCH must be dropped. However, if the UE, instead of following the prior assessment, decides to determine whether it could operate as a responding device, that transmission may not be dropped if the gNB has indeed acquired a g-FFP over which this transmission may be performed.

Scenario #3 (as illustrated in FIG. 3) illustrates the case when a CG UL transmission overlapping with the UE's idle period does not belong to a burst containing a transmission which starts at the beginning of the u-FFP. Furthermore, the CG UL transmission overlapping with the UE's idle period does not fall within the same g-FFP compared to the CG UL transmission that lies at the boundary of the u-FFP. In this case, it should be pointed out that the UE may have different behaviors. The following are some examples of possible UE behaviors:

first perform presence detection and then assess whether to drop or not the CG UL transmission overlapping with the UE's idle period and therefore overwrite any possible assumptions that the UE has already made in terms of initiating device; or first verify/assess whether based on the assumptions already made it shall perform as an initiating device and in this case drop the transmission, even before performing presence detection.

In some of cases indicated above, the outcome of the transmission may be different and ambiguously defined based on the UE's behavior. For example, if the UE has already determined that it shall operate as an initiating device within a u-FFP where the CG PUSCH transmission overlapping with the UE's idle period lies, then this CG PUSCH must be dropped. However, if the UE, instead of following the prior assessment, decides to determine whether it could operate as a responding device, that transmission may not be dropped if the gNB has indeed acquired a g-FFP over which this transmission may be performed. In some other cases, as in scenario #3 (e.g., as depicted in FIG. 3), the outcome of the transmission may be the same, but some power saving may be achieved by skipping the presence detection operation.

In order to solve the ambiguity in UE's behavior highlighted above, a clearer UE's behavior may be desired.

In one embodiment, when the CG UL transmission occurs after the beginning of a UE's period of duration $T_u$ and would overlap with the idle duration corresponding to that period, the UE may be required to prioritize operation as a responding device and in this case it shall first determine whether it should operate as a responding device despite of previously made assumptions, and if it is not able to operate as responding device, this transmission may be dropped. In other words, if the configured UL transmission would occur after the beginning of a UE's period of duration $T_u$ and would overlap with the idle duration corresponding to that period, the following is applied:

If the CG UL transmission would occur within a gNB's period of duration $T_x$ and would end before the idle duration corresponding to that period and the UE has already determined that the gNB has initiated a channel occupancy in that period, the UE assumes that the CG UL transmission is associated with the channel occupancy that is initiated by the gNB.

Otherwise, the UE drops the CG UL transmission.

In another embodiment, when the CG UL transmission occurs after the beginning of a UE's period of duration $T_u$ and would overlap with the idle duration corresponding to that period, the UE may be required to prioritize any previously made assumptions. If the UE has already assessed that it shall operate as an initiating device, then this transmission should be dropped, and the UE should not perform any additional assessment of whether it could operate as a responding device. In other words, if the CG UL transmission would occur after the beginning of a period of duration $T_u$ and would overlap with the idle duration corresponding to that period, the following is applied:

If the UE has not already initiated a channel occupancy in that period

If the configured UL transmission would occur within a period of duration $T_x$ and would end before the idle duration corresponding to that period and the UE has already determined that the gNB has initiated a channel occupancy in that period as described in Clause 4.3.1.2.1, the UE assumes that the configured UL transmission is associated with the channel occupancy that is initiated by the gNB.

Otherwise, the UE drops the configured UL transmission.

Otherwise, the UE drops the configured UL transmission.

Initiating COT Assessment Procedure for Cross-Carrier Scheduled UL Transmissions During Rel.17, the UE's behavior in terms of COT initiation assumptions for dynamic grant (DG) UL transmissions that occur within the case carrier where the related UL scheduling DCI is transmitted has been defined and the following agreement was reached by 3GPP:

Agreement

In semi-static channel access mode, when the gNB schedules by a downlink control information (DCI) a UL transmission and the scheduling DCI and the scheduled UL transmission are in a same g-FFP but on different resource block (RB) sets of the g-FFP bandwidth:

If DCI indicates gNB initiated COT, validation of the gNB-initiated COT (based on the detection of DL transmission from the gNB) for the RB sets with scheduled UL can be skipped.

However, the UE's behavior in case the DG UL transmission and the related UL scheduling DCI are transmitted in different carriers was not discussed and the related UE's behavior may be undefined by the legacy framework.

In one embodiment, when a scheduled UL transmission and the corresponding scheduling DCI are confined within the same g-FFP of duration $T_x$ over which the DCI is transmitted (it will be noted that that cross-FFP scheduling is referred here to the case when the scheduled UL will not fall within the g-FFP over which the scheduling DCI is transmitted regardless of whether they are transmitted within the same carrier or not) or as an alternative the g-FFP of duration $T_x$ corresponding to the same carrier(s) over which the UL transmission is scheduled (it will be noted that cross-FFP scheduling is referred here to the case when the scheduled UL will not fall within the g-FFP belonging to the same carrier), but they are confined in different RB sets (within or over an LBT BW or LBT BWs, each of 20 MHz) across different carriers (which may be different than those used by the g-FFP transmitting the UL scheduling DCI), the UE's behavior may be as follows:
- if the DCI indicates that the UE should operate as responding device, the UE can skip validating the COT assumptions, and follow that indicated by the DCI. Therefore, under the assumption that the UE operates indeed as responding device, a DG transmission will be performed upon applying the cyclic prefix indicated in the DCI and upon the channel access procedure is satisfied/successful, otherwise the transmission will be dropped.
- If the DCI indicates that the UE should operate as an initiating device:
  - If the UL transmission would occur at the beginning of a UE's period of duration $T_u$ (e.g., per cell or across all RB sets or LBT BWs), the UE is expected to sense the channel immediately before the UL transmission, and if the channel is sensed to be idle, the UE is expected to transmit the UL transmission. Otherwise, the transmission will be dropped.
  - If the UL transmission would occur after the beginning of a UE's period of duration $T_u$ (e.g., per cell or across all RB sets or LBT BWs), if the UE has not initiated that FFP (e.g., per cell or across all RB sets or LBT BWs), the UE is expected to drop the transmission. Otherwise, if the UE has initiated that FFP, and the DG transmission does not overlap with the idle period that FFP, the DG transmission will be performed upon applying the cyclic prefix indicated in the DCI and upon the channel access procedure is satisfied/successful, otherwise the transmission will be dropped.

Notice that when the UE is indicated to operate as an initiating device, the above behavior may be either applied cumulatively across all RB sets or LBT BWs over which the UL transmission may span, or may be individually applied per RB set or LBT BW. In case the described behavior is
- cumulatively applied across all the RB sets or LBT BW over which the UL transmission may span, then the FFP configuration across RB sets (or LBT BWs, each of 20 MHz) must be the same for each UEs and/or for the gNB;
- individually applied across all the RB sets or LBT BW over which the UL transmission may span, then transmission occurs only if the channel access requirements are met across all the RB sets or LBT BWS, otherwise the transmission will be dropped.

In one option of this embodiment, the FFP configurations across RB sets (or LBT BWs, each of 20 MHz) may be the same for the each UE and/or for the gNB.

In another option, if a scheduled UL transmission and the corresponding scheduling DCI are not confined within the same g-FFP of duration $T_x$ over which the DCI is transmitted (notice that cross-FFP scheduling is referred here to the case when the scheduled UL won't fall within the g-FFP over which the scheduling DCI is transmitted regardless of whether they are transmitted within the same carrier or not) or as an alternative the g-FFP of duration $T_x$ corresponding to the same carrier(s) over which the UL transmission is scheduled (notice that cross-FFP scheduling is referred here to the case when the scheduled UL won't fall within the g-FFP belonging to the same carrier), but they are confined within different RB sets (within or over an LBT BW or LBT BWs, each of 20 MHz) across different carriers (which may be different than those used by the g-FFP transmitting the UL scheduling DCI), the UE's behavior is as follows:
- if the DCI indicates that the UE should operate as responding device,
  - If the DG UL transmission would occur after the beginning of the gNB's period of duration $T_x$ (e.g., per cell or across all RB sets or LBT BWs), and ends before the idle period of that period, and if the UE has been able to determine that the channel occupancy time of that period has been initiated by the gNB, then UE may be able to perform that transmission upon applying the cyclic prefix indicated in the DCI and upon the channel access procedure is satisfied/successful, otherwise the transmission will be dropped.

It will be noted that the UE could either cumulatively check whether the conditions provided above are met or in alternative it could check individually across all the RB sets or LBT BW over which the UL transmission may span. In this last case, it must make sure that the conditions provided above are met across all RB sets or LBT BW over which the UL transmission may span.
- If the DCI indicates that the UE should operate as an initiating device,
  - If the UL transmission would occur at the beginning of a UE's period of duration $T_u$ (e.g., per cell or across all RB sets or LBT BWs), the UE is expected to sense the channel immediately before the UL transmission, and if the channel is sensed to be idle, the UE is expected to transmit the UL transmission. Otherwise, the transmission will be dropped.
  - If the UL transmission would occur after the beginning of a UE's period of duration $T_u$ (e.g., per cell or across all RB sets or LBT BWs), if the UE has not initiated that FFP (e.g., per cell or across all RB sets or LBT BWs), the UE is expected to drop the transmission. Otherwise, if the UE has initiated that FFP, and the DG transmission does not overlap with the idle period that FFP, the DG transmission will be performed upon the channel access procedure if satisfied, otherwise it will be dropped.

It will be noted that when the UE is indicated to operate as an initiating device, the above behavior could be either applied cumulatively across all RB sets or LBT BWs over which the UL transmission may span, or can be individually applied per RB set or LBT BW. In case the described behavior is
- cumulatively applied across all the RB sets or LBT BW over which the UL transmission may span, then the FFP configuration across RB sets (or LBT BWs, each of 20 MHz) must be the same for each UEs and/or for the gNB;
- individually applied across all the RB sets or LBT BW over which the UL transmission may span, then transmission occurs only if the channel access requirements are met across all the RB sets or LBT BWS, otherwise the transmission will be dropped.

In one option of this embodiment, the FFP configurations across RB sets (or LBT BWs, each of 20 MHz) is the same for the each UE and/or for the gNB.

In another option, regardless of whether a scheduled UL transmission and the corresponding scheduling DCI are confined or not within the same g-FFP of duration $T_x$ over which the DCI is transmitted (notice that cross-FFP scheduling is referred here to the case when the scheduled UL won't fall within the g-FFP over which the scheduling DCI is transmitted regardless of whether they are transmitted within the same carrier or not) or as an alternative the g-FFP of duration $T_x$ corresponding to the same carrier(s) over which the UL transmission is scheduled (notice that cross-FFP scheduling is referred here to the case when the scheduled UL won't fall within the g-FFP belonging to the same carrier), but they are confined within different RB sets (within or over an LBT BW or LBT BWs, each of 20 MHz) across different carriers (which may be different than those used by the g-FFP transmitting the UL scheduling DCI), the UE's behavior may be as follows:

if the DCI indicates that the UE should operate as responding device,

If the DG UL transmission would occur after the beginning of the gNB's period of duration $T_x$ (e.g., per cell or across all RB sets or LBT BWs), and ends before the idle period of that period, and if the UE has been able to determine that the channel occupancy time of that period has been initiated by the gNB, then UE may be able to perform that transmission upon applying the cyclic prefix indicated in the DCI and upon the channel access procedure is satisfied/successful, otherwise the transmission will be dropped.

It will be noted that the UE could either cumulatively check whether the conditions provided above are met or in alternative it could check individually across all the RB sets or LBT BW over which the UL transmission may span. In this last case, the UE may be required to ensure that the conditions provided above are met across all RB sets or LBT BW over which the UL transmission may span.

If the DCI indicates that the UE should operate as an initiating device,

If the UL transmission would occur at the beginning of a UE's period of duration $T_u$ (e.g., per cell or across all RB sets or LBT BWs), the UE is expected to sense the channel immediately before the UL transmission, and if the channel is sensed to be idle, the UE is expected to transmit the UL transmission. Otherwise, the transmission will be dropped.

If the UL transmission would occur after the beginning of a UE's period of duration $T_u$ (e.g., per cell or across all RB sets or LBT BWs), if the UE has not initiated that FFP (e.g., per cell or across all RB sets or LBT BWs), the UE is expected to drop the transmission. Otherwise, if the UE has initiated that FFP, and the DG transmission does not overlap with the idle period that FFP, the DG transmission will be performed upon the channel access procedure if satisfied, otherwise it will be dropped.

It will be noted that when the UE is indicated to operate as an initiating device, the above behavior could be either applied cumulatively across all RB sets or LBT BWs over which the UL transmission may span, or can be individually applied per RB set or LBT BW. In case the described behavior is cumulatively applied across all the RB sets or LBT BW over which the UL transmission may span, then the FFP configuration across RB sets (or LBT BWs, each of 20 MHz) must be the same for each UEs and/or for the gNB;

individually applied across all the RB sets or LBT BW over which the UL transmission may span, then transmission occurs only if the channel access requirements are met across all the RB sets or LBT BWS, otherwise the transmission will be dropped.

In one option of this embodiment, the FFP configurations across RB sets (or LBT BWs, each of 20 MHz) may be the same for the each UE and/or for the gNB.

Notice that the embodiments and/or options listed above are not mutually exclusive, and one or more of them may apply together.

Segmentation Across the Idle Period when the cg-RetransmissionTimer-16 is Enabled As mentioned previously, during Rel.17, 3GPP agreed that for PUSCH repetition Type B, segmentation of a nominal repetition would be performed if this overlaps with a set of symbols associated to the idle period of a g-FFP in case the UE shares the g-FFP's COT, or associated to the idle period of a u-FFP in case the UE assumed UE's initiated COT. The agreement was as follows:

Agreement

In semi-static channel access mode, for PUSCH repetition Type B: If a nominal repetition overlaps with a set of symbols in an idle period associated to gNB's FFP in case UE shares gNB-initiated COT for the nominal repetition or associated to UE's FFP in case UE assumes UE-initiated COT for the nominal repetition, all the symbols in the idle period should be considered as invalid symbols which are not considered for an actual repetition as in Rel-16.

Segmentation before and/or after the idle period is applied when applicable.

FFS on impact of processing timeline for PUSCH on the UE behaviour

However, the legacy framework and agreements may not clarify whether this feature should be also extended to other types of repetition schemes supported when operating URLLC in unlicensed spectrum.

In this matter, in one embodiment of this disclosure, when the higher layer parameter cg-RetransmissionTimer-16 is enabled, if a nominal repetition overlaps with the idle period of a g-FFP in case the UE shares the g-FFP's COT, or associated to the idle period of a u-FFP in case the UE assumed UE's initiated COT, segmentation should be applied. In this case, the symbols overlapping with the idle period of a g-FFP in case the UE shares the g-FFP's COT, or associated to the idle period of a u-FFP in case the UE assumed UE's initiated COT will be considered invalid.

In one embodiment, when the higher layer parameter cg-RetransmissionTimer-16 is enabled and a nominal transmission overlaps with the idle period of a g-FFP in case the UE shares the g-FFP's COT, or associated to the idle period of a u-FFP in case the UE assumed UE's initiated COT, if a PUCCH is multiplexed with the corresponding CG-PUSCH transmission and an HARQ-ACK feedback is not multiplexed on a CG-PUSCH, then the number of resource elements (REs) devoted to CG-UCI for the actual transmission of that CG-PUSCH transmission should be modified as shown in red and calculated as follows:

$$Q'_{CG-UCI} = \min\left\{ \left\lceil \frac{(O_{CG-UCI} + L_{CG-UCI}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \right.$$

$$\left. \left\lceil \alpha \cdot \sum_{l=0}^{N_{symb,nominal}^{PUSCH}-1} M_{sc,nominal}^{UCI}(l) \right\rceil, \sum_{l=0}^{N_{symb,actual}^{PUSCH}-1} M_{sc,actual}^{UCI}(l) \right\}$$

where $O_{CG-UCI}$ is the number of CG-UCI bits;

$L_{CG-UCI}$ is the number of CRC bits for CG-UCI determined according to Clause 6.3.1.2.1;

$\beta_{offset}^{PUSCH} = \beta_{offset}^{CG-UCI}$;

$C_{UL-SCH}$ is the number of code blocks for UL-SCH of the PUSCH transmission;

$K_r$ is the r-th code block size for UL-SCH of the PUSCH transmission;

$M_{sc,nominal}^{UCI}(l)$ is the number of resource elements that can be used for transmission of UCI in OFDM symbol l, for l=0, 1, 2, . . . , $N_{symb,nominal}^{PUSCH}-1$, in the PUSCH transmission assuming a nominal repetition without segmentation, and $N_{symb,nominal}^{PUSCH}$ is the total number of OFDM symbols in a nominal repetition of the PUSCH, including all OFDM symbols used for DMRS;

for any OFDM symbol that carries DMRS of the PUSCH assuming a nominal repetition without segmentation, $M_{sc,nominal}^{UCI}(l)=0$;

for any OFDM symbol that does not carry DMRS of the PUSCH assuming a nominal repetition without segmentation, $M_{sc,nominal}^{UCI}(l)=M_{sc}^{PUSCH} - M_{sc,nominal}^{PT-RA}(l)$ where $M_{sc,nominal}^{PT-RA}(l)$ is the number of subcarriers in OFDM symbol l that carries PTRS, in the PUSCH transmission assuming a nominal repetition without segmentation;

$M_{sc,actual}^{UCI}(l)$ is the number of resource elements that can be used for transmission of UCI in OFDM symbol l, for l=0, 1, 2, . . . , $N_{symb,actual}^{PUSCH}-1$, in the actual repetition of the PUSCH transmission, and $N_{symb,actual}^{PUSCH}$ is the total number of OFDM symbols in the actual repetition of the PUSCH transmission, including all OFDM symbols used for DMRS;

for any OFDM symbol that carries DMRS of the actual repetition of the PUSCH transmission, $M_{sc,actual}^{UCI}(l)=0$;

for any OFDM symbol that does not carry DMRS of the actual repetition of the PUSCH transmission, $M_{sc,actual}^{UCI}(l)=M_{sc}^{PUSCH} - M_{sc,actual}^{PT-RS}(l)$ where $M_{sc,actual}^{PT-RS}(l)$ is the number of subcarriers in OFDM symbol l that carries PTRS, in the actual repetition of the PUSCH transmission;

α is configured by higher layer parameter scaling.

In one embodiment, when the higher layer parameter cg-RetransmissionTimer-16 is enabled and a nominal transmission overlaps with the idle period of a g-FFP in case the UE shares the g-FFP's COT, or associated to the idle period of a u-FFP in case the UE assumed UE's initiated COT, if a PUCCH is multiplexed with the corresponding CG-PUSCH transmission and HARQ-ACK feedback is multiplexed on that CG-PUSCH, and jointly encoded with it, then the number of RE devoted to HARQ-ACK and CG_UCI, called $Q'_{ACK}$, for the actual transmission of that CG-PUSCH transmission should be modified, and calculated as follows:

$$Q'_{ACK} = \min\left\{ \left\lceil \frac{(O_{ACK} + O_{CG-UCI} + L_{ACK}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \right.$$

$$\left. \left\lceil \alpha \cdot \sum_{l=0}^{N_{symb,nominal}^{PUSCH}-1} M_{sc,nominal}^{UCI}(l) \right\rceil, \sum_{l=0}^{N_{symb,actual}^{PUSCH}-1} M_{sc,actual}^{UCI}(l) \right\}$$

where $O_{ACK}$ is the number of HARQ-ACK bits;

$O_{CG-UCI}$ is the number of CG-UCI bits;

if $O_{ACK}+O_{CG-UCI}>360$, $L_{ACK}=11$; otherwise $L_{ACK}$ is the number of CRC bits for HARQ-ACK and CG-UCI determined according to Clause 6.3.1.2.1;

$\beta_{offset}^{PUSCH} = \beta_{offset}^{HARQ-ACK}$;

$C_{UL-SCH}$ is the number of code blocks for UL-SCH of the PUSCH transmission;

$K_r$ is the r-th code block size for UL-SCH of the PUSCH transmission;

$M_{sc,nominal}^{UCI}(l)$ is the number of resource elements that can be used for transmission of UCI in OFDM symbol l, for l=0, 1, 2, . . . , $N_{symb,nominal}^{PUSCH}-1$, in the PUSCH transmission assuming a nominal repetition without segmentation, and $N_{symb,nominal}^{PUSCH}$ is the total number of OFDM symbols in a nominal repetition of the PUSCH, including all OFDM symbols used for DMRS;

for any OFDM symbol that carries DMRS of the PUSCH assuming a nominal repetition without segmentation, $M_{sc,nominal}^{UCI}(l)=0$;

for any OFDM symbol that does not carry DMRS of the PUSCH assuming a nominal repetition without segmentation, $M_{sc,nominal}^{UCI}(l)=M_{sc}^{PUSCH} - M_{sc,nominal}^{PT-RS}(l)$ where $M_{sc,nominal}^{PT-RS}(l)$ is the number of subcarriers in OFDM symbol l that carries PTRS, in the PUSCH transmission assuming a nominal repetition without segmentation;

$M_{sc,actual}^{UCI}(l)$ is the number of resource elements that can be used for transmission of UCI in OFDM symbol l, for l=0, 1, 2, . . . , $N_{symb,actual}^{PUSCH}-1$, in the actual repetition of the PUSCH transmission, and $N_{symb,actual}^{PUSCH}$ is the total number of OFDM symbols in the actual repetition of the PUSCH transmission, including all OFDM symbols used for DMRS;

for any OFDM symbol that carries DMRS of the actual repetition of the PUSCH transmission, $M_{sc,actual}^{UCI}(l)=0$;

for any OFDM symbol that does not carry DMRS of the actual repetition of the PUSCH transmission, $M_{sc,actual}^{UCI}(l)=M_{sc}^{PUSCH} - M_{sc,actual}^{PT-RS}(l)$ where $M_{sc,actual}^{PT-RS}(l)$ is the number of subcarriers in OFDM symbol l that carries PTRS, in the actual repetition of the PUSCH transmission;

α is configured by higher layer parameter scaling.

It will be noted that the embodiments and options listed above are not mutually exclusive, and one or more of them may apply together.

Report for Systematic/Consistent Uplink LBT Failure in Semi-Static Channel Access Mode Within the NR-U Rel.16 design, a procedure to handle consistent/systematic uplink listen-before-talk (LBT) failures was established, through which by reporting to higher layers any channel access failures a UE counts the LBT failures and, once it establishes that a consistent LBT failure has occurred, it reports this information to the serving cell. Furthermore in Rel.16, regardless of whether a system operates in semi-static channel access mode and a UE operates as a responding device or operates in dynamic channel access mode, if a UE fails to acquire a channel(s) by assessing it to be idle during the LBT procedure, a UE may have multiple other back-to-back opportunities to reperform LBT again, acquire the channel(s), and then transmit. However, in Rel.17 a system operating in unlicensed mode may now allow a UE to operate as an initiating device when configured to operate in semi-static channel access mode. In this case, if the UE fails to acquire the channel(s) when the UE operates as initiating device and the intended UL transmission occurs at the u-FFP boundary, a UE may not be able to transmit and perform any additional sensing for the entire duration of that u-FFP. Therefore, a technique to distinguish or highlight/weight with higher priority such an LBT failure, which may be detrimental for system performance and latency, may be desirable.

In one embodiment, for the case when a UE operates as an initiating device, and the UE fails to access the channel(s) prior to an intended UL transmission which aligns with a u-FFP, Layer 1 only notifies higher layer about the channel access failure occurring at the beginning of the u-FFP.

In one embodiment, for the case when a UE operates as an initiating device, and the UE fails to access the channel(s) prior to an intended UL transmission which aligns with a u-FFP, Layer 1 notifies higher layer about a channel access failure for each burst that the UE was intended to transmit within that u-FFP, including that aligning with that u-FFP.

In one embodiment, for the case when a UE operates as an initiating device, and the UE fails to access the channel(s) prior to an intended UL transmission which aligns with a u-FFP, Layer 1 notifies higher layer about a channel access failure for each UL transmission that the UE was intended to transmit within that u-FFP, including that aligning with that u-FFP.

In one embodiment, for the case when a UE is configured to operate as an initiating device, and the UE fails to access the channel(s) prior to an intended UL transmission which aligns with a u-FFP, Layer 1 notifies higher layer about a channel access failure for any UL bursts occurring within that u-FFP for which the UE assesses that it may operate as an initiating device except for the case when an UL burst is composed by an UL transmission which overlaps with the UE's idle period.

In one embodiment, for the case when a UE is configured to operate as an initiating device, and the UE fails to access the channel(s) prior to an intended UL transmission which aligns with a u-FFP, Layer 1 notifies higher layer about a channel access failure for any UL transmission occurring within that u-FFP for which the UE assesses that it may operate as an initiating device except for UL transmissions which overlaps with the UE's idle period.

In another embodiment, additionally to the LBT failure reporting introduced in Rel.16, a UE may additionally notify higher layer and make separate counts of any LBT failure occurring at a u-FFP boundary when the UE assesses that it should operate as an initiating device.

Systems and Implementations

FIGS. 4-7 illustrate various systems, devices, and components that may implement aspects of disclosed embodiments.

Figure 4:
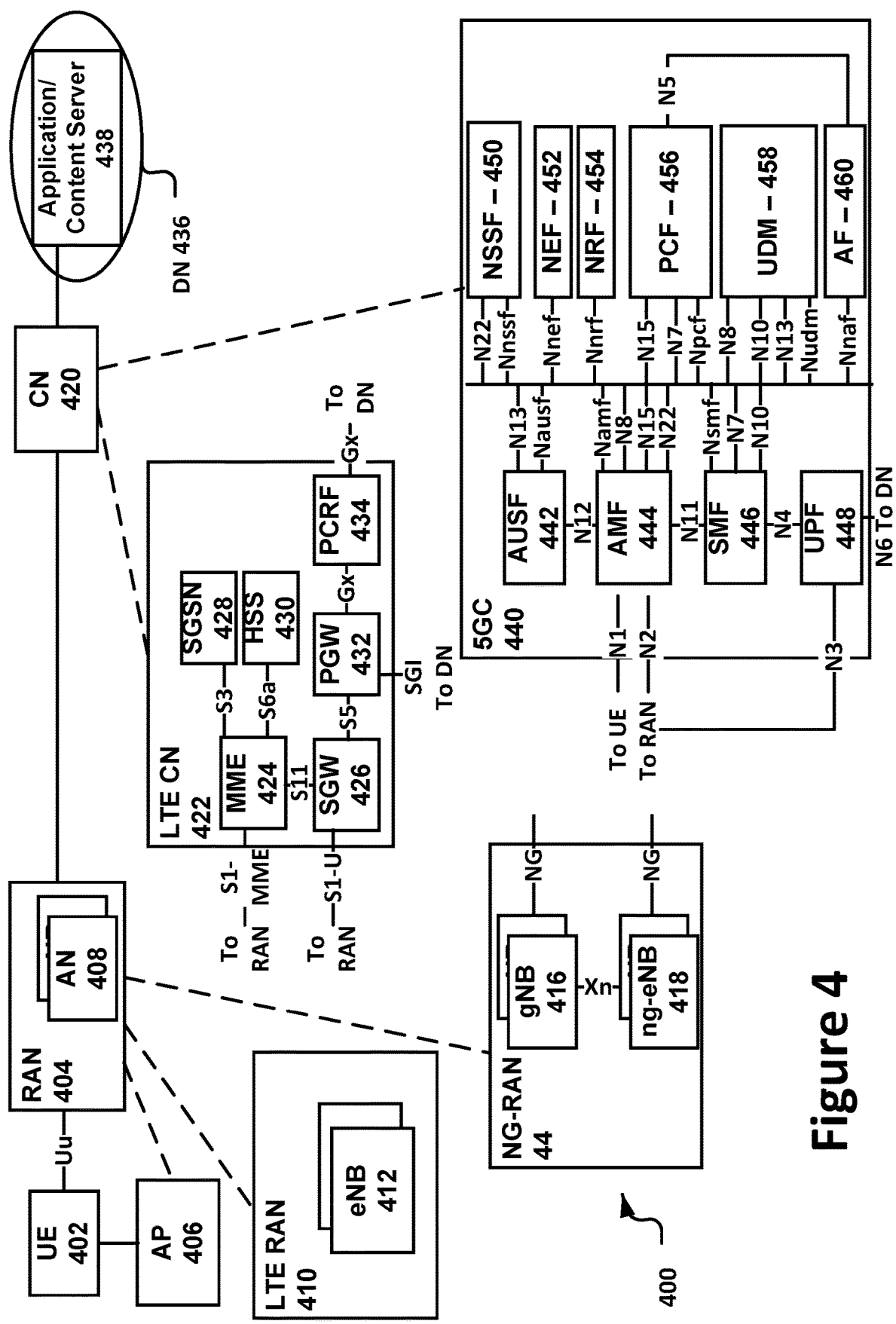
FIG. 4 schematically illustrates a wireless network in accordance with various embodiments.

FIG. 4 illustrates a network 400 in accordance with various embodiments. The network 400 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 400 may include a UE 402, which may include any mobile or non-mobile computing device designed to communicate with a RAN 404 via an over-the-air connection. The UE 402 may be communicatively coupled with the RAN 404 by a Uu interface. The UE 402 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 400 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 402 may additionally communicate with an AP 406 via an over-the-air connection. The AP 406 may manage a WLAN connection, which may serve to offload some/all network traffic from the RAN 404. The connection between the UE 402 and the AP 406 may be consistent with any IEEE 802.11 protocol, wherein the AP 406 could be a wireless fidelity (Wi-Fi®) router. In some embodiments, the UE 402, RAN 404, and AP 406 may utilize cellular-WLAN aggregation (for example, LWA/LWIP). Cellular-WLAN aggregation may involve the UE 402 being configured by the RAN 404 to utilize both cellular radio resources and WLAN resources.

The RAN 404 may include one or more access nodes, for example, AN 408. AN 408 may terminate air-interface protocols for the UE 402 by providing access stratum protocols including RRC, PDCP, RLC, MAC, and L1 protocols. In this manner, the AN 408 may enable data/voice connectivity between CN 420 and the UE 402. In some embodiments, the AN 408 may be implemented in a discrete device or as one or more software entities running on server computers as part of, for example, a virtual network, which may be referred to as a CRAN or virtual baseband unit pool. The AN 408 be referred to as a BS, gNB, RAN node, eNB, ng-eNB, NodeB, RSU, TRxP, TRP, etc. The AN 408 may be a macrocell base station or a low power base station for providing femtocells, picocells or other like cells having smaller coverage areas, smaller user capacity, or higher bandwidth compared to macrocells.

In embodiments in which the RAN 404 includes a plurality of ANs, they may be coupled with one another via an X2 interface (if the RAN 404 is an LTE RAN) or an Xn interface (if the RAN 404 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 404 may each manage one or more cells, cell groups, component carriers, etc. to provide the UE 402 with an air interface for network access. The UE 402 may be simultaneously connected with a plurality of cells provided by the same or different ANs of the RAN 404. For example, the UE 402 and RAN 404 may use carrier aggregation to allow the UE 402 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 404 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 402 or AN 408 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 404 may be an LTE RAN 410 with eNBs, for example, eNB 412. The LTE RAN 410 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 404 may be an NG-RAN 414 with gNBs, for example, gNB 416, or ng-eNBs, for example, ng-eNB 418. The gNB 416 may connect with 5G-enabled UEs using a 5G NR interface. The gNB 416 may connect with a 5G core through an NG interface, which may include an N2 interface or an N3 interface. The ng-eNB 418 may also connect with the 5G core through an NG interface, but may connect with a UE via an LTE air interface. The gNB 416 and the ng-eNB 418 may connect with each other over an Xn interface.

In some embodiments, the NG interface may be split into two parts, an NG user plane (NG-U) interface, which carries traffic data between the nodes of the NG-RAN 414 and a UPF 448 (e.g., N3 interface), and an NG control plane (NG-C) interface, which is a signaling interface between the nodes of the NG-RAN 414 and an AMF 444 (e.g., N2 interface).

The NG-RAN 414 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 402 can be configured with multiple BWPs where each BWP configuration has a different SCS. When a BWP change is indicated to the UE 402, the SCS of the transmission is changed as well. Another use case example of BWP is related to power saving. In particular, multiple BWPs can be configured for the UE 402 with different amount of frequency resources (for example, PRBs) to support data transmission under different traffic loading scenarios. A BWP containing a smaller number of PRBs can be used for data transmission with small traffic load while allowing power saving at the UE 402 and in some cases at the gNB 416. A BWP containing a larger number of PRBs can be used for scenarios with higher traffic load.

The RAN 404 is communicatively coupled to CN 420 that includes network elements to provide various functions to support data and telecommunications services to customers/subscribers (for example, users of UE 402). The components of the CN 420 may be implemented in one physical node or separate physical nodes. In some embodiments, NFV may be utilized to virtualize any or all of the functions provided by the network elements of the CN 420 onto physical compute/storage resources in servers, switches, etc. A logical instantiation of the CN 420 may be referred to as a network slice, and a logical instantiation of a portion of the CN 420 may be referred to as a network sub-slice.

In some embodiments, the CN 420 may be an LTE CN 422, which may also be referred to as an EPC. The LTE CN 422 may include MME 424, SGW 426, SGSN 428, HSS 430, PGW 432, and PCRF 434 coupled with one another over interfaces (or "reference points") as shown. Functions of the elements of the LTE CN 422 may be briefly introduced as follows.

The MME 424 may implement mobility management functions to track a current location of the UE 402 to facilitate paging, bearer activation/deactivation, handovers, gateway selection, authentication, etc.

The SGW 426 may terminate an S1 interface toward the RAN and route data packets between the RAN and the LTE CN 422. The SGW 426 may be a local mobility anchor point for inter-RAN node handovers and also may provide an anchor for inter-3GPP mobility. Other responsibilities may include lawful intercept, charging, and some policy enforcement.

The SGSN 428 may track a location of the UE 402 and perform security functions and access control. In addition, the SGSN 428 may perform inter-EPC node signaling for mobility between different RAT networks; PDN and S-GW selection as specified by MME 424; MME selection for handovers; etc. The S3 reference point between the MME 424 and the SGSN 428 may enable user and bearer information exchange for inter-3GPP access network mobility in idle/active states.

The HSS 430 may include a database for network users, including subscription-related information to support the network entities' handling of communication sessions. The HSS 430 can provide support for routing/roaming, authentication, authorization, naming/addressing resolution, location dependencies, etc. An S6a reference point between the HSS 430 and the MME 424 may enable transfer of subscription and authentication data for authenticating/authorizing user access to the LTE CN 420.

The PGW 432 may terminate an SGi interface toward a data network (DN) 436 that may include an application/content server 438. The PGW 432 may route data packets between the LTE CN 422 and the data network 436. The PGW 432 may be coupled with the SGW 426 by an S5 reference point to facilitate user plane tunneling and tunnel management. The PGW 432 may further include a node for policy enforcement and charging data collection (for example, PCEF). Additionally, the SGi reference point between the PGW 432 and the data network 436 may be an operator external public, a private PDN, or an intra-operator packet data network, for example, for provision of IMS services. The PGW 432 may be coupled with a PCRF 434 via a Gx reference point.

The PCRF 434 is the policy and charging control element of the LTE CN 422. The PCRF 434 may be communicatively coupled to the app/content server 438 to determine appropriate QoS and charging parameters for service flows. The PCRF 432 may provision associated rules into a PCEF (via Gx reference point) with appropriate TFT and QCI.

In some embodiments, the CN 420 may be a 5GC 440. The 5GC 440 may include an AUSF 442, AMF 444, SMF 446, UPF 448, NSSF 450, NEF 452, NRF 454, PCF 456, UDM 458, and AF 460 coupled with one another over interfaces (or "reference points") as shown. Functions of the elements of the 5GC 440 may be briefly introduced as follows.

The AUSF 442 may store data for authentication of UE 402 and handle authentication-related functionality. The AUSF 442 may facilitate a common authentication framework for various access types. In addition to communicating with other elements of the 5GC 440 over reference points as shown, the AUSF 442 may exhibit an Nausf service-based interface.

The AMF 444 may allow other functions of the 5GC 440 to communicate with the UE 402 and the RAN 404 and to subscribe to notifications about mobility events with respect to the UE 402. The AMF 444 may be responsible for registration management (for example, for registering UE 402), connection management, reachability management, mobility management, lawful interception of AMF-related events, and access authentication and authorization. The AMF 444 may provide transport for SM messages between the UE 402 and the SMF 446, and act as a transparent proxy for routing SM messages. AMF 444 may also provide transport for SMS messages between UE 402 and an SMSF. AMF 444 may interact with the AUSF 442 and the UE 402 to perform various security anchor and context management functions. Furthermore, AMF 444 may be a termination point of a RAN CP interface, which may include or be an N2 reference point between the RAN 404 and the AMF 444; and the AMF 444 may be a termination point of NAS (N1) signaling, and perform NAS ciphering and integrity protection. AMF 444 may also support NAS signaling with the UE 402 over an N3 IWF interface.

The SMF 446 may be responsible for SM (for example, session establishment, tunnel management between UPF 448 and AN 408); UE IP address allocation and management (including optional authorization); selection and control of UP function; configuring traffic steering at UPF 448 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 444 over N2 to AN 408; and determining SSC mode of a session. SM may refer to management of a PDU session, and a PDU session or "session" may refer to a PDU connectivity service that provides or enables the exchange of PDUs between the UE 402 and the data network 436.

The UPF 448 may act as an anchor point for intra-RAT and inter-RAT mobility, an external PDU session point of interconnect to data network 436, and a branching point to support multi-homed PDU session. The UPF 448 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 448 may include an uplink classifier to support routing traffic flows to a data network.

The NSSF 450 may select a set of network slice instances serving the UE 402. The NSSF 450 may also determine allowed NSSAI and the mapping to the subscribed S-NS-SAIs, if needed. The NSSF 450 may also determine the AMF set to be used to serve the UE 402, or a list of candidate AMFs based on a suitable configuration and possibly by querying the NRF 454. The selection of a set of network slice instances for the UE 402 may be triggered by the AMF 444 with which the UE 402 is registered by interacting with the NSSF 450, which may lead to a change of AMF. The NSSF 450 may interact with the AMF 444 via an N22 reference point; and may communicate with another NSSF in a visited network via an N31 reference point (not shown). Additionally, the NSSF 450 may exhibit an Nnssf service-based interface.

The NEF 452 may securely expose services and capabilities provided by 3GPP network functions for third party, internal exposure/re-exposure, AFs (e.g., AF 460), edge computing or fog computing systems, etc. In such embodiments, the NEF 452 may authenticate, authorize, or throttle the AFs. NEF 452 may also translate information exchanged with the AF 460 and information exchanged with internal network functions. For example, the NEF 452 may translate between an AF-Service-Identifier and an internal 5GC information. NEF 452 may also receive information from other NFs based on exposed capabilities of other NFs. This information may be stored at the NEF 452 as structured data, or at a data storage NF using standardized interfaces. The stored information can then be re-exposed by the NEF 452 to other NFs and AFs, or used for other purposes such as analytics. Additionally, the NEF 452 may exhibit an Nnef service-based interface.

The NRF 454 may support service discovery functions, receive NF discovery requests from NF instances, and provide the information of the discovered NF instances to the NF instances. NRF 454 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 454 may exhibit the Nnrf service-based interface.

The PCF 456 may provide policy rules to control plane functions to enforce them, and may also support unified policy framework to govern network behavior. The PCF 456 may also implement a front end to access subscription information relevant for policy decisions in a UDR of the UDM 458. In addition to communicating with functions over reference points as shown, the PCF 456 exhibit an Npcf service-based interface.

The UDM 458 may handle subscription-related information to support the network entities' handling of communication sessions, and may store subscription data of UE 402. For example, subscription data may be communicated via an N8 reference point between the UDM 458 and the AMF 444. The UDM 458 may include two parts, an application front end and a UDR. The UDR may store subscription data and policy data for the UDM 458 and the PCF 456, and/or structured data for exposure and application data (including PFDs for application detection, application request information for multiple UEs 402) for the NEF 452. The Nudr service-based interface may be exhibited by the UDR 221 to allow the UDM 458, PCF 456, and NEF 452 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 458 may exhibit the Nudm service-based interface.

The AF 460 may provide application influence on traffic routing, provide access to NEF, and interact with the policy framework for policy control.

In some embodiments, the 5GC 440 may enable edge computing by selecting operator/3rd party services to be geographically close to a point that the UE 402 is attached to the network. This may reduce latency and load on the network. To provide edge-computing implementations, the 5GC 440 may select a UPF 448 close to the UE 402 and execute traffic steering from the UPF 448 to data network 436 via the N6 interface. This may be based on the UE subscription data, UE location, and information provided by the AF 460. In this way, the AF 460 may influence UPF (re)selection and traffic routing. Based on operator deployment, when AF 460 is considered to be a trusted entity, the network operator may permit AF 460 to interact directly with relevant NFs. Additionally, the AF 460 may exhibit an Naf service-based interface.

The data network 436 may represent various network operator services, Internet access, or third party services that may be provided by one or more servers including, for example, application/content server 438.

Figure 5:
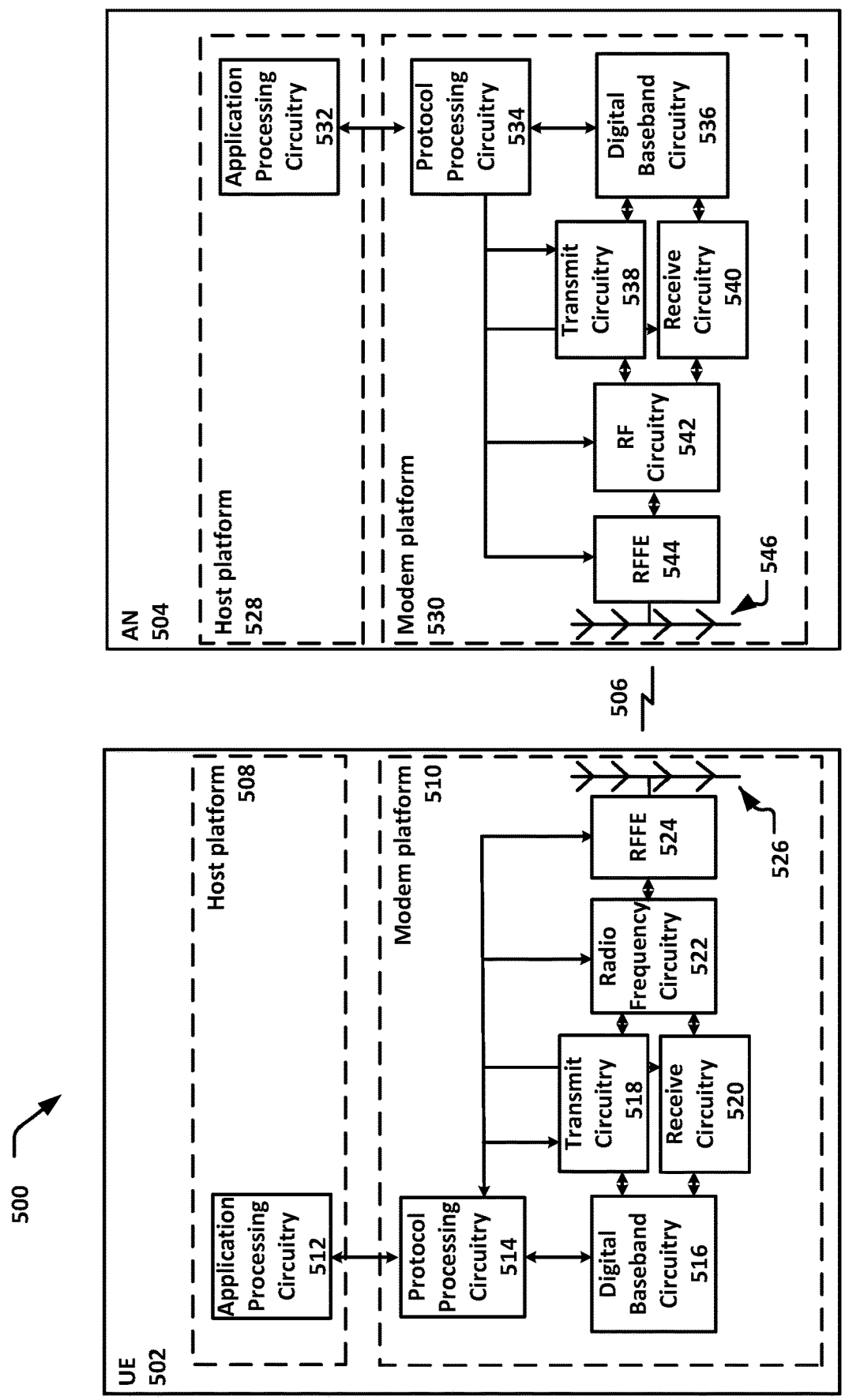
FIG. 5 schematically illustrates components of a wireless network in accordance with various embodiments.

FIG. 5 schematically illustrates a wireless network 500 in accordance with various embodiments. The wireless network 500 may include a UE 502 in wireless communication with an AN 504. The UE 502 and AN 504 may be similar to, and substantially interchangeable with, like-named components described elsewhere herein.

The UE 502 may be communicatively coupled with the AN 504 via connection 506. The connection 506 is illustrated as an air interface to enable communicative coupling, and can be consistent with cellular communications protocols such as an LTE protocol or a 5G NR protocol operating at mmWave or sub-6 GHz frequencies.

The UE 502 may include a host platform 508 coupled with a modem platform 510. The host platform 508 may include application processing circuitry 512, which may be coupled with protocol processing circuitry 514 of the modem platform 510. The application processing circuitry 512 may run various applications for the UE 502 that source/sink application data. The application processing circuitry 512 may further implement one or more layer operations to transmit/receive application data to/from a data network. These layer operations may include transport (for example UDP) and Internet (for example, IP) operations The protocol processing circuitry 514 may implement one or more of layer operations to facilitate transmission or reception of data over the connection 506. The layer operations implemented by the protocol processing circuitry 514 may include, for example, MAC, RLC, PDCP, RRC and NAS operations.

The modem platform 510 may further include digital baseband circuitry 516 that may implement one or more layer operations that are "below" layer operations performed by the protocol processing circuitry 514 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 510 may further include transmit circuitry 518, receive circuitry 520, RF circuitry 522, and RF front end (RFFE) 524, which may include or connect to one or more antenna panels 526. Briefly, the transmit circuitry 518 may include a digital-to-analog converter, mixer, intermediate frequency (IF) components, etc.; the receive circuitry 520 may include an analog-to-digital converter, mixer, IF components, etc.; the RF circuitry 522 may include a low-noise amplifier, a power amplifier, power tracking components, etc.; RFFE 524 may include filters (for example, surface/bulk acoustic wave filters), switches, antenna tuners, beamforming components (for example, phase-array antenna components), etc. The selection and arrangement of the components of the transmit circuitry 518, receive circuitry 520, RF circuitry 522, RFFE 524, and antenna panels 526 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 514 may include one or more instances of control circuitry (not shown) to provide control functions for the transmit/receive components.

A UE reception may be established by and via the antenna panels 526, RFFE 524, RF circuitry 522, receive circuitry 520, digital baseband circuitry 516, and protocol processing circuitry 514. In some embodiments, the antenna panels 526 may receive a transmission from the AN 504 by receive-beamforming signals received by a plurality of antennas/antenna elements of the one or more antenna panels 526.

A UE transmission may be established by and via the protocol processing circuitry 514, digital baseband circuitry 516, transmit circuitry 518, RF circuitry 522, RFFE 524, and antenna panels 526. In some embodiments, the transmit components of the UE 504 may apply a spatial filter to the data to be transmitted to form a transmit beam emitted by the antenna elements of the antenna panels 526.

Similar to the UE 502, the AN 504 may include a host platform 528 coupled with a modem platform 530. The host platform 528 may include application processing circuitry 532 coupled with protocol processing circuitry 534 of the modem platform 530. The modem platform may further include digital baseband circuitry 536, transmit circuitry 538, receive circuitry 540, RF circuitry 542, RFFE circuitry 544, and antenna panels 546. The components of the AN 504 may be similar to and substantially interchangeable with like-named components of the UE 502. In addition to performing data transmission/reception as described above, the components of the AN 508 may perform various logical functions that include, for example, RNC functions such as radio bearer management, uplink and downlink dynamic radio resource management, and data packet scheduling.

Figure 6:
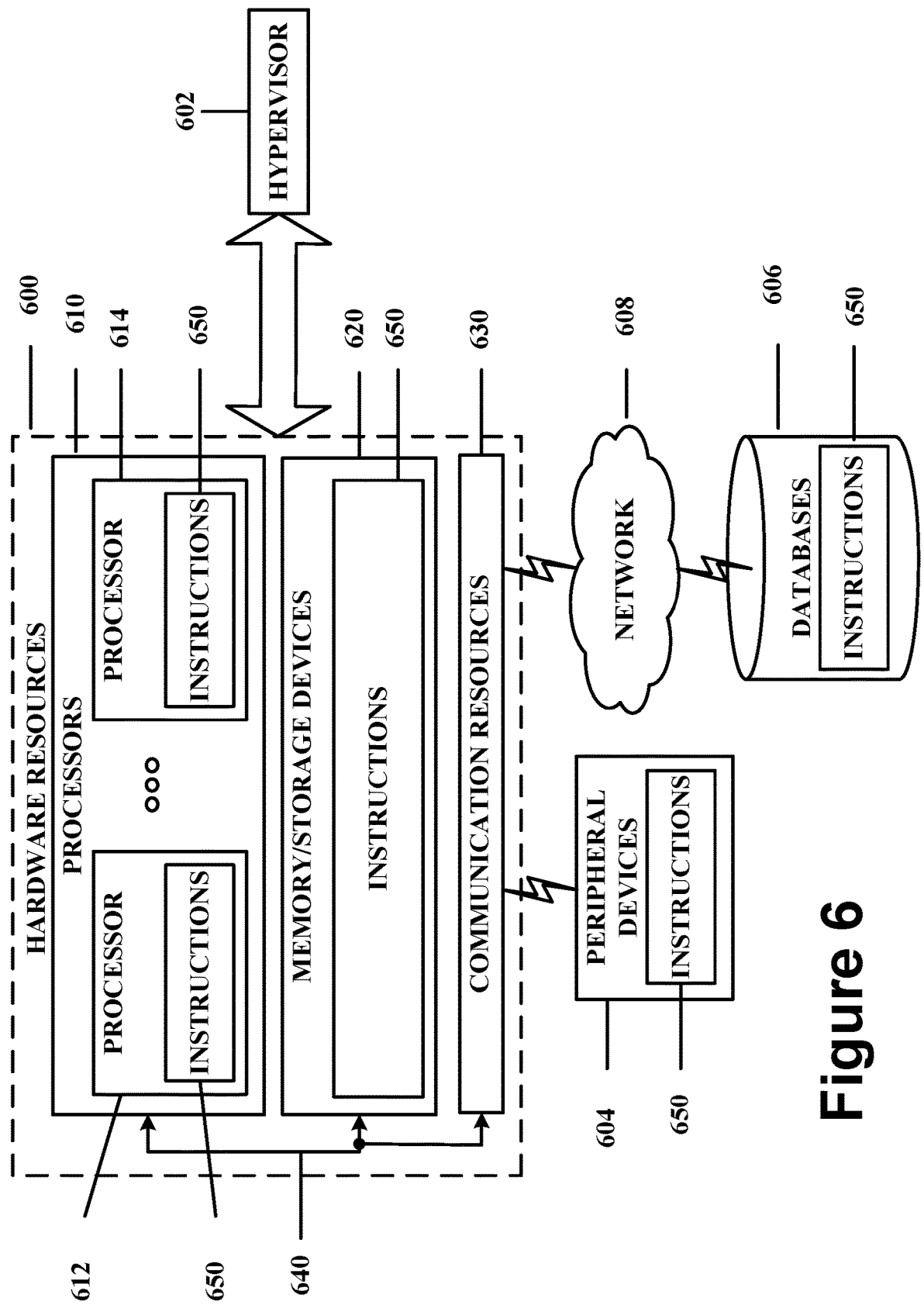
FIG. 6 is a block diagram illustrating components, according to some example embodiments, able to read instructions from a machine-readable or computer-readable medium (e.g., a non-transitory machine-readable storage medium) and perform any one or more of the methodologies discussed herein.

FIG. 6 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640 or other interface circuitry. For embodiments where node virtualization (e.g., NFV) is utilized, a hypervisor 602 may be executed to provide an execution environment for one or more network slices/sub-slices to utilize the hardware resources 600.

The processors 610 may include, for example, a processor 612 and a processor 614. The processors 610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 620 may include main memory, disk storage, or any suitable combination thereof. The memory/storage devices 620 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 630 may include interconnection or network interface controllers, components, or other suitable devices to communicate with one or more peripheral devices 604 or one or more databases 606 or other network elements via a network 608. For example, the communication resources 630 may include wired communication components (e.g., for coupling via USB, Ethernet, etc.), cellular communication components, NFC components, Bluetooth® (or Bluetooth® Low Energy) components, Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
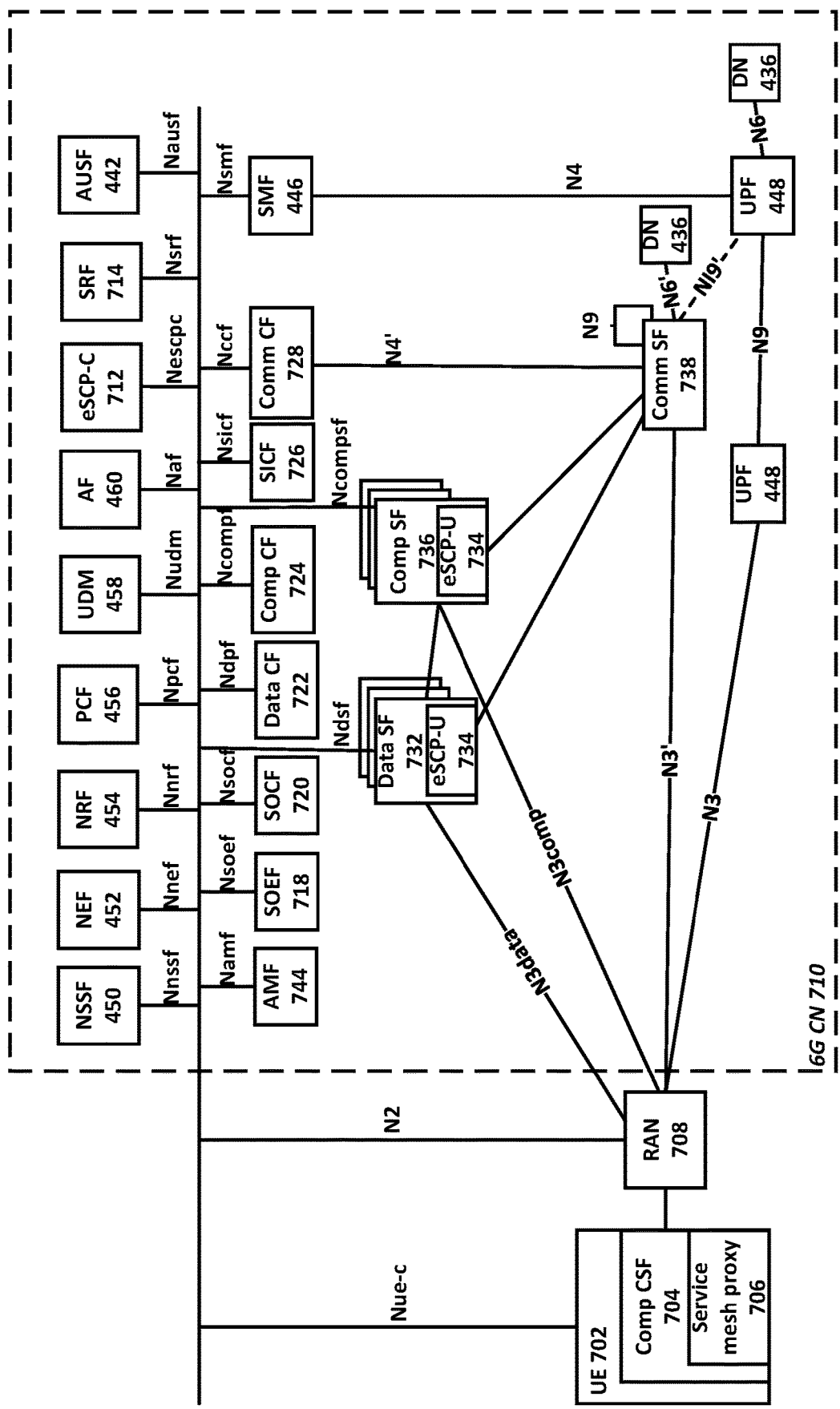
FIG. 7 schematically illustrates an alternative wireless network in accordance with various embodiments.

FIG. 7 illustrates a network 700 in accordance with various embodiments. The network 700 may operate in a matter consistent with 3GPP technical specifications or technical reports for 6G systems. In some embodiments, the network 700 may operate concurrently with network 400. For example, in some embodiments, the network 700 may share one or more frequency or bandwidth resources with network 400. As one specific example, a UE (e.g., UE 702) may be configured to operate in both network 700 and network 400. Such configuration may be based on a UE including circuitry configured for communication with frequency and bandwidth resources of both networks 400 and 700. In general, several elements of network 700 may share one or more characteristics with elements of network 400. For the sake of brevity and clarity, such elements may not be repeated in the description of network 700.

The network 700 may include a UE 702, which may include any mobile or non-mobile computing device designed to communicate with a RAN 708 via an over-the-air connection. The UE 702 may be similar to, for example, UE 402. The UE 702 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

Although not specifically shown in FIG. 7, in some embodiments the network 700 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc. Similarly, although not specifically shown in FIG. 7, the UE 702 may be communicatively coupled with an AP such as AP 406 as described with respect to FIG. 4. Additionally, although not specifically shown in FIG. 7, in some embodiments the RAN 708 may include one or more ANss such as AN 408 as described with respect to FIG. 4. The RAN 708 and/or the AN of the RAN 708 may be referred to as a base station (BS), a RAN node, or using some other term or name.

The UE 702 and the RAN 708 may be configured to communicate via an air interface that may be referred to as a sixth generation (6G) air interface. The 6G air interface may include one or more features such as communication in a terahertz (THz) or sub-THz bandwidth, or joint communication and sensing. As used herein, the term "joint communication and sensing" may refer to a system that allows for wireless communication as well as radar-based sensing via various types of multiplexing. As used herein, THz or sub-THz bandwidths may refer to communication in the 80 GHz and above frequency ranges. Such frequency ranges may additionally or alternatively be referred to as "millimeter wave" or "mmWave" frequency ranges.

The RAN 708 may allow for communication between the UE 702 and a 6G core network (CN) 710. Specifically, the RAN 708 may facilitate the transmission and reception of data between the UE 702 and the 6G CN 710. The 6G CN 710 may include various functions such as NSSF 450, NEF 452, NRF 454, PCF 456, UDM 458, AF 460, SMF 446, and AUSF 442. The 6G CN 710 may additional include UPF 448 and DN 436 as shown in FIG. 7.

Additionally, the RAN 708 may include various additional functions that are in addition to, or alternative to, functions of a legacy cellular network such as a 4G or 5G network. Two such functions may include a Compute Control Function (Comp CF) 724 and a Compute Service Function (Comp SF) 736. The Comp CF 724 and the Comp SF 736 may be parts or functions of the Computing Service Plane. Comp CF 724 may be a control plane function that provides functionalities such as management of the Comp SF 736, computing task context generation and management (e.g., create, read, modify, delete), interaction with the underlaying computing infrastructure for computing resource management, etc. Comp SF 736 may be a user plane function that serves as the gateway to interface computing service users (such as UE 702) and computing nodes behind a Comp SF instance. Some functionalities of the Comp SF 736 may include: parse computing service data received from users to compute tasks executable by computing nodes; hold service mesh ingress gateway or service API gateway; service and charging policies enforcement; performance monitoring and telemetry collection, etc. In some embodiments, a Comp SF 736 instance may serve as the user plane gateway for a cluster of computing nodes. A Comp CF 724 instance may control one or more Comp SF 736 instances.

Two other such functions may include a Communication Control Function (Comm CF) 728 and a Communication Service Function (Comm SF) 738, which may be parts of the Communication Service Plane. The Comm CF 728 may be the control plane function for managing the Comm SF 738, communication sessions creation/configuration/releasing, and managing communication session context. The Comm SF 738 may be a user plane function for data transport. Comm CF 728 and Comm SF 738 may be considered as upgrades of SMF 446 and UPF 448, which were described with respect to a 5G system in FIG. 4. The upgrades provided by the Comm CF 728 and the Comm SF 738 may enable service-aware transport. For legacy (e.g., 4G or 5G) data transport, SMF 446 and UPF 448 may still be used.

Two other such functions may include a Data Control Function (Data CF) 722 and Data Service Function (Data SF) 732 may be parts of the Data Service Plane. Data CF 722 may be a control plane function and provides functionalities such as Data SF 732 management, Data service creation/configuration/releasing, Data service context management, etc. Data SF 732 may be a user plane function and serve as the gateway between data service users (such as UE 702 and the various functions of the 6G CN 710) and data service endpoints behind the gateway. Specific functionalities may include include: parse data service user data and forward to corresponding data service endpoints, generate charging data, report data service status.

Another such function may be the Service Orchestration and Chaining Function (SOCF) 720, which may discover, orchestrate and chain up communication/computing/data services provided by functions in the network. Upon receiving service requests from users, SOCF 720 may interact with one or more of Comp CF 724, Comm CF 728, and Data CF 722 to identify Comp SF 736, Comm SF 738, and Data SF 732 instances, configure service resources, and generate the service chain, which could contain multiple Comp SF 736, Comm SF 738, and Data SF 732 instances and their associated computing endpoints. Workload processing and data movement may then be conducted within the generated service chain. The SOCF 720 may also responsible for maintaining, updating, and releasing a created service chain.

Another such function may be the service registration function (SRF) 714, which may act as a registry for system services provided in the user plane such as services provided by service endpoints behind Comp SF 736 and Data SF 732 gateways and services provided by the UE 702. The SRF 714 may be considered a counterpart of NRF 454, which may act as the registry for network functions.

Other such functions may include an evolved service communication proxy (eSCP) and service infrastructure control function (SICF) 726, which may provide service communication infrastructure for control plane services and user plane services. The eSCP may be related to the service communication proxy (SCP) of 5G with user plane service communication proxy capabilities being added. The eSCP is therefore expressed in two parts: eCSP-C 712 and eSCP-U 734, for control plane service communication proxy and user plane service communication proxy, respectively. The SICF 726 may control and configure eCSP instances in terms of service traffic routing policies, access rules, load balancing configurations, performance monitoring, etc.

Another such function is the AMF 744. The AMF 744 may be similar to 444, but with additional functionality. Specifically, the AMF 744 may include potential functional repartition, such as move the message forwarding functionality from the AMF 744 to the RAN 708.

Another such function is the service orchestration exposure function (SOEF) 718. The SOEF may be configured to expose service orchestration and chaining services to external users such as applications.

The UE 702 may include an additional function that is referred to as a computing client service function (comp CSF) 704. The comp CSF 704 may have both the control plane functionalities and user plane functionalities, and may interact with corresponding network side functions such as SOCF 720, Comp CF 724, Comp SF 736, Data CF 722, and/or Data SF 732 for service discovery, request/response, compute task workload exchange, etc. The Comp CSF 704 may also work with network side functions to decide on whether a computing task should be run on the UE 702, the RAN 708, and/or an element of the 6G CN 710.

The UE 702 and/or the Comp CSF 704 may include a service mesh proxy 706. The service mesh proxy 706 may act as a proxy for service-to-service communication in the user plane. Capabilities of the service mesh proxy 706 may include one or more of addressing, security, load balancing, etc.

Example Procedures

Figure 8:
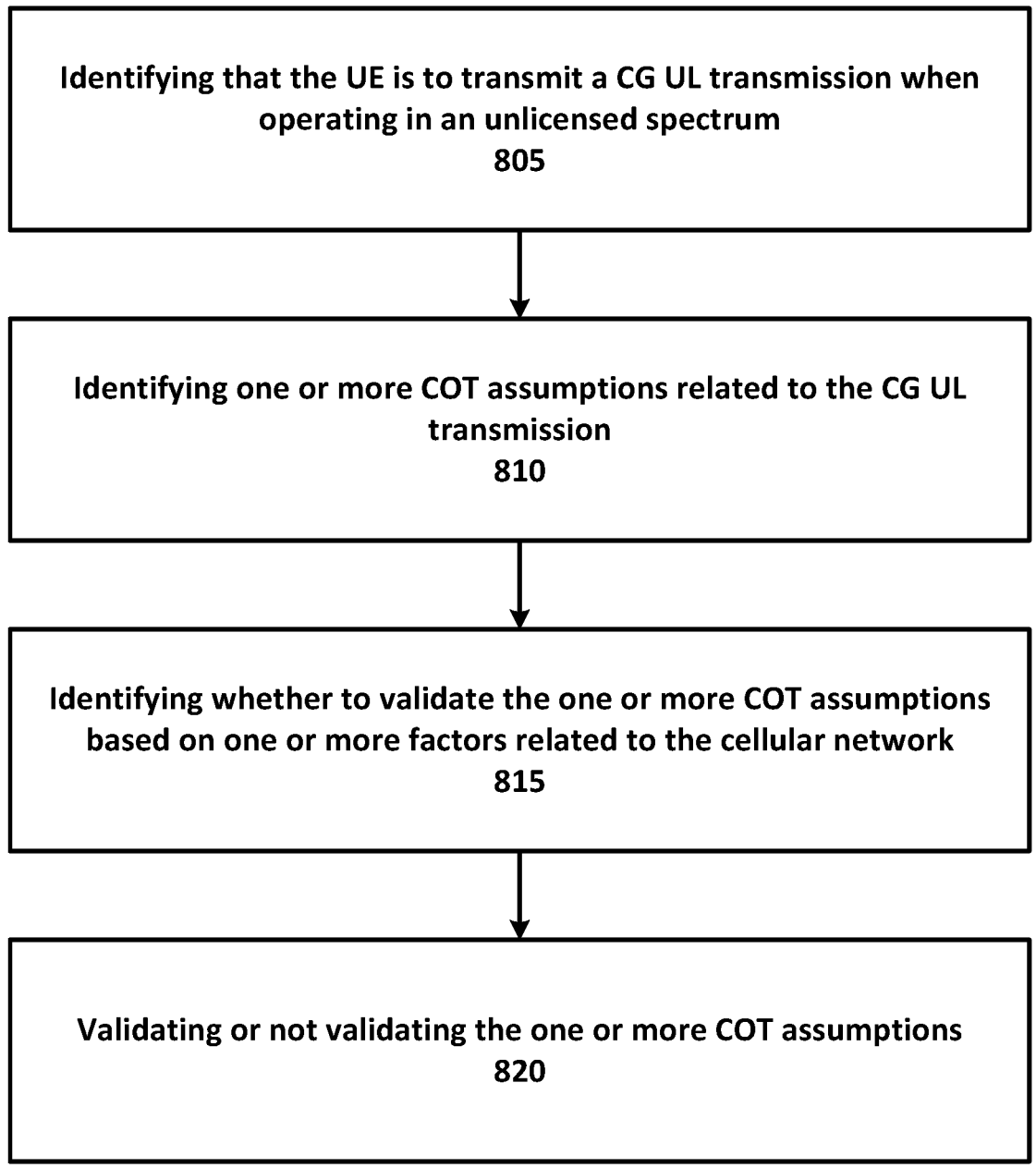
FIG. 8 depicts an example technique to be performed by a UE of a cellular network, in accordance with various embodiments.

In some embodiments, the electronic device(s), network(s), system(s), chip(s) or component(s), or portions or implementations thereof, of FIGS. 4-7, or some other figure herein, may be configured to perform one or more processes, techniques, or methods as described herein, or portions thereof. One such process is depicted in FIG. 8. The process may be performed by a UE of a cellular network, one or more elements of a UE, and/or an electronic device that includes or implements a UE. The process may include identifying, at 805, that the UE is to transmit a configured grant (CG) uplink (UL) transmission when operating in an unlicensed spectrum; identifying, at 810, one or more channel occupancy time (COT) assumptions related to the CG UL transmission; identifying, at 815, whether to validate the one or more COT assumptions based on one or more factors related to the cellular network; and validating or not validating, at 820, the one or more COT assumptions.

Figure 9:
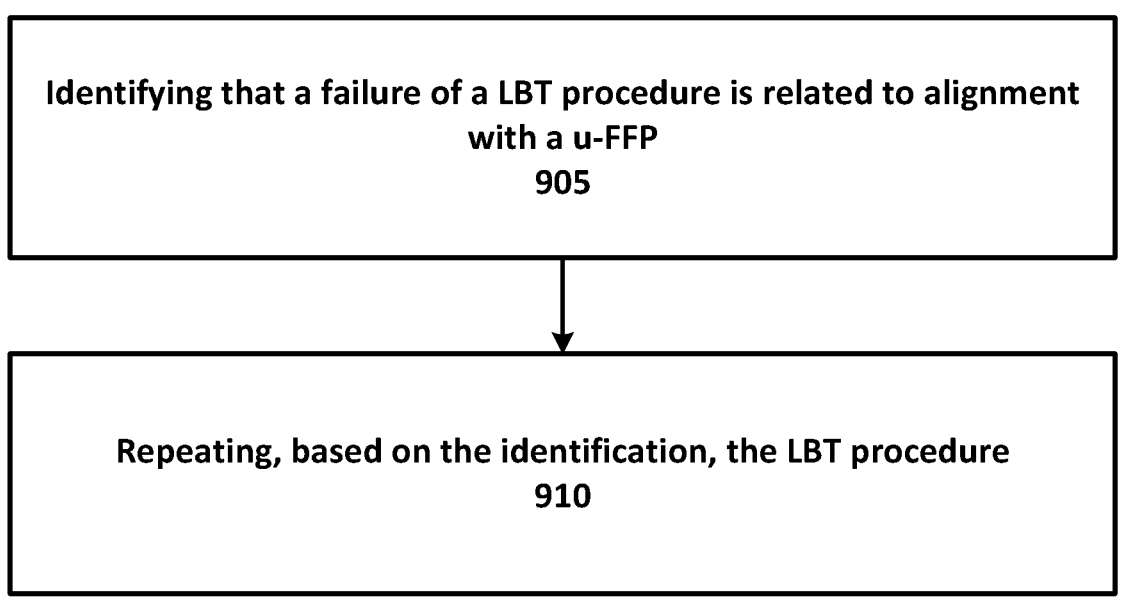
FIG. 9 depicts an alternative example technique to be performed by a UE of a cellular network, in accordance with various embodiments.

Another such process is depicted in FIG. 9. The process may be performed by a UE of a cellular network, one or more elements of a UE, and/or an electronic device that includes or implements a UE. The process may include identifying, at 905, that a failure of a listen-before-talk (LBT) procedure is related to alignment with a u-FFP; and repeating, at 910 based on the identification, the LBT procedure.

Figure 10:
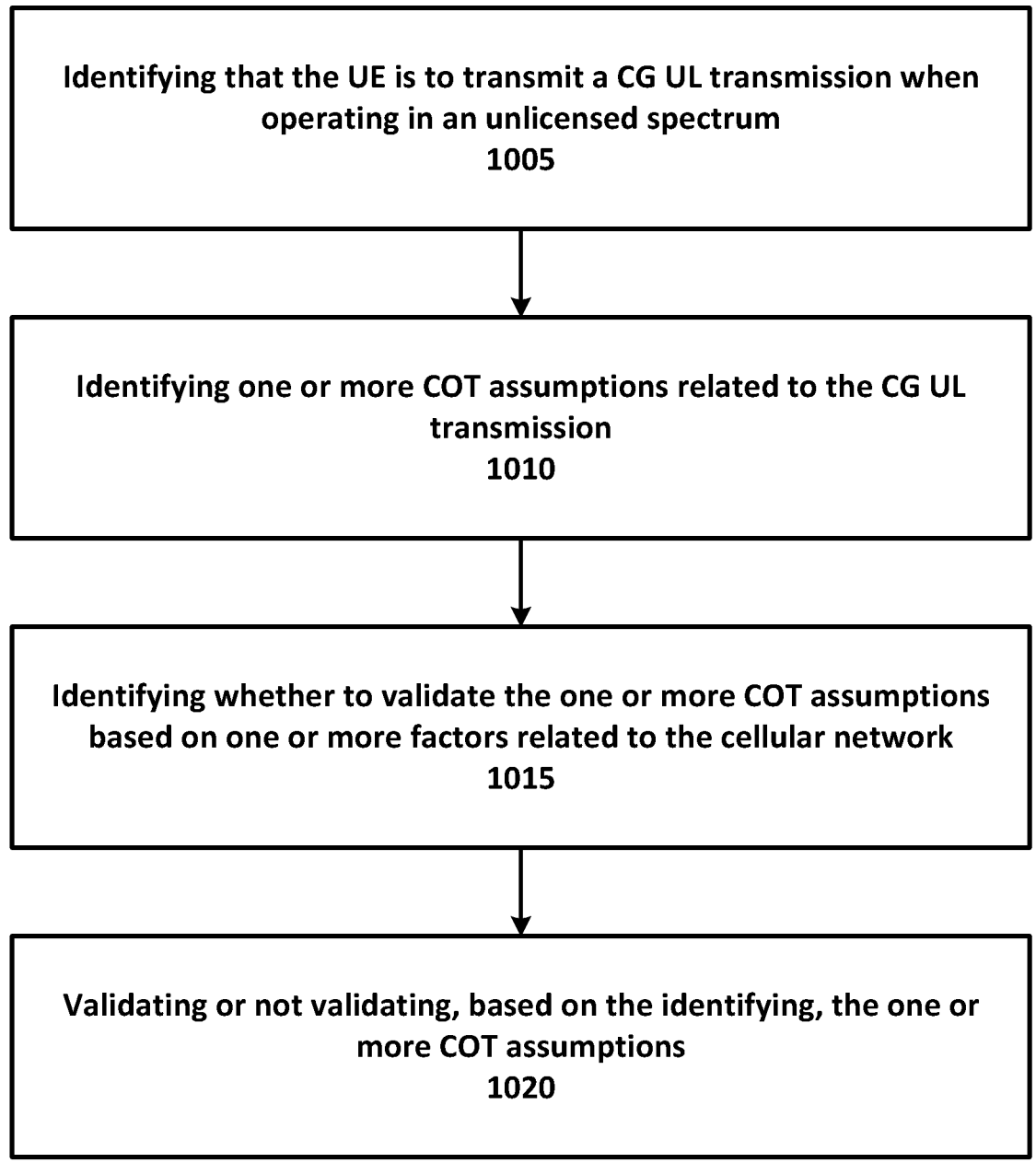
FIG. 10 depicts an alternative example technique to be performed by a UE of a cellular network, in accordance with various embodiments.

Another such process is depicted in FIG. 10. The process may be performed by a UE of a cellular network, one or more elements of a UE, and/or an electronic device that includes or implements a UE. The process may include identifying, at 1005, that the UE is to transmit a configured grant (CG) uplink (UL) transmission when operating in an unlicensed spectrum; identifying, at 1010, one or more channel occupancy time (COT) assumptions related to the CG UL transmission; identifying, at 1015, whether to validate the one or more COT assumptions based on one or more factors related to the cellular network; and validating or not validating, at 1020 based on the identifying, the one or more COT assumptions.

Figure 11:
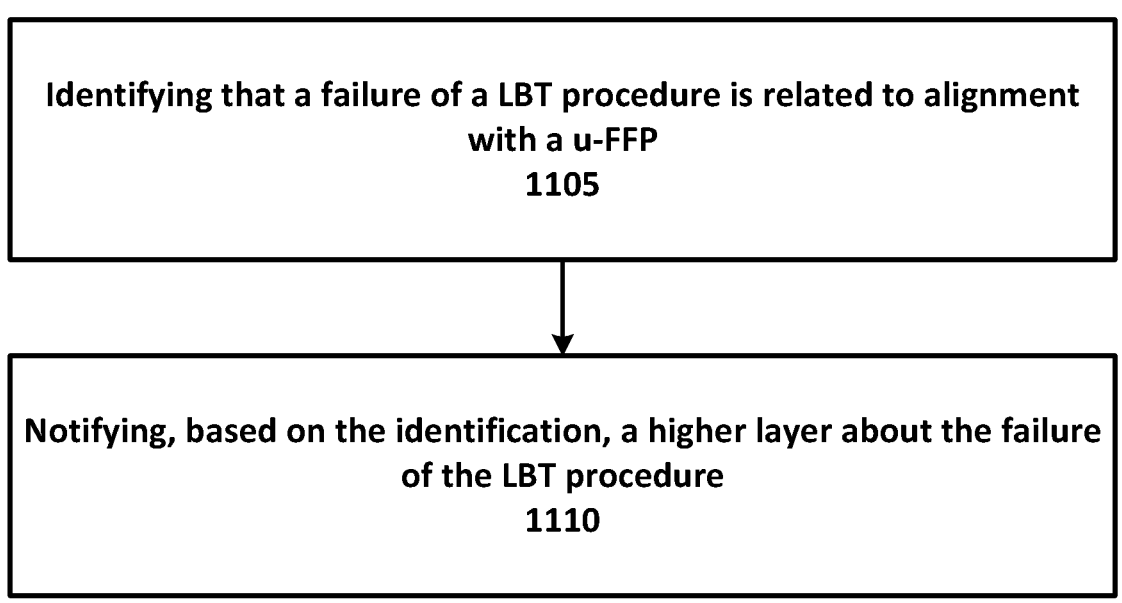
FIG. 11 depicts an alternative example technique to be performed by a UE of a cellular network, in accordance with various embodiments.

Another such process is depicted in FIG. 11. The process may be performed by a UE of a cellular network, one or more elements of a UE, and/or an electronic device that includes or implements a UE. The process may include identifying, at 1105, that a failure of a listen-before-talk (LBT) procedure is related to alignment with a u-FFP; and notifying, at 1120 based on the identification, a higher layer about the failure of the LBT procedure.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include this disclosure provides different options on how the UE should behave when determining the COT initiator assumptions when transmitting a CG UL transmission when operating in unlicensed spectrum.

Example 2 may include this disclosure also provides different options on how the UE should behave in case of multi-carrier operation, and provides a new definition of intra and cross-FFP scheduling.

Example 3 may include the method of example 2 and/or some other example herein, when a scheduled UL transmission and the corresponding scheduling DCI are confined within the same g-FFP of duration $T_x$ over which the DCI is transmitted or as an alternative the g-FFP of duration $T_x$ corresponding to the same carrier(s) over which the UL transmission is, but they are confined in different RB sets (within or over an LBT BW or LBT BWs, each of 20 MHz) across different carriers (which may be different than those used by the g-FFP transmitting the UL scheduling DCI), if the UE is indicated to operate as responding device it may skip the process of validating the COT assumption.

Example 4 may include the method of example 2 and/or some other example herein, when a scheduled UL transmission and the corresponding scheduling DCI are not confined within the same g-FFP of duration $T_x$ over which the DCI is transmitted or as an alternative the g-FFP of duration $T_x$ corresponding to the same carrier(s) over which the UL transmission is, but they are confined in different RB sets (within or over an LBT BW or LBT BWs, each of 20 MHz) across different carriers (which may be different than those used by the g-FFP transmitting the UL scheduling DCI), if the UE is indicated to operate as responding device, before transmitting it may need to validate the COT assumption.

Example 5 may include the method of example 2 and/or some other example herein, wherein regardless of whether a scheduled UL transmission and the corresponding scheduling DCI are confined or not within the same g-FFP of duration $T_x$ over which the DCI is transmitted or as an alternative the g-FFP of duration $T_x$ corresponding to the same carrier(s) over which the UL transmission is, but they are confined in different RB sets (within or over an LBT BW or LBT BWs, each of 20 MHz) across different carriers (which may be different than those used by the g-FFP transmitting the UL scheduling DCI), if the UE is indicated to operate as responding device, before transmitting it may need to validate the COT assumption.

Example 6 may include this disclosure also provides details on how to enable segmentation across an idle period when the NR-U repetition scheme is used.

Example 7 may include details on how to distinguish or highlight/weight with higher priority an LBT failure occurring at a UE for an intended UL transmission aligning with a u-FFP when that UE assesses that it should operates as an initiating device, compared to other typical cases when LBT fails at the UE's side, and the UE may have other back-to-back opportunities to attempt again the LBT procedure and transmission.

Example 8 includes a method to be performed by a user equipment (UE) of a cellular network, the method comprising: identifying that the UE is to transmit a configured grant (CG) uplink (UL) transmission when operating in an unlicensed spectrum; identifying one or more channel occupancy time (COT) assumptions related to the CG UL transmission; identifying whether to validate the one or more COT assumptions based on one or more factors related to the cellular network; and validating or not validating the one or more COT assumptions.

Example 9 includes a method to be performed by a user equipment (UE) of a cellular network, the method comprising: identifying that a failure of a listen-before-talk (LBT)

procedure is related to alignment with a u-FFP; and repeating, based on the identification, the LBT procedure.

Example 10 includes a method to be performed by a user equipment (UE) of a cellular network, the method comprising: identifying that the UE is to transmit a configured grant (CG) uplink (UL) transmission when operating in an unlicensed spectrum; identifying one or more channel occupancy time (COT) assumptions related to the CG UL transmission; identifying whether to validate the one or more COT assumptions based on one or more factors related to the cellular network; and validating or not validating, based on the identifying, the one or more COT assumptions.

Example 11 includes the method of example 10, and/or some other example herein, wherein the one or more COT assumptions are based on a downlink control information (DCI).

Example 12 includes the method of any of examples 10-11, and/or some other example herein, wherein the one or more factors related to the cellular network include an identification that the UL transmission and an indication of the one or more COT assumptions are within a same g-fixed frame period (FFP).

Example 13 includes the method of any of examples 10-12, and/or some other example herein, wherein the one or more factors related to the cellular network is based on a resource block (RB) set to which the UL transmission is confined.

Example 14 includes the method of any of examples 10-12, and/or some other example herein, wherein the one or more factors related to the cellular network include an indication from a base station that the UE is to operate as a responding device.

Example 15 includes the method of any of examples 10-14, and/or some other example herein, wherein the one or more factors related to the cellular network include an indication from a base station that the UE is to operate as an initiating device.

Example 16 includes a method to be performed by a user equipment (UE) of a cellular network, the method comprising: identifying that a failure of a listen-before-talk (LBT) procedure is related to alignment with a u-FFP; and notifying, based on the identification, a higher layer about the failure of the LBT procedure.

Example 17 includes the method of example 16, and/or some other example herein, wherein the failure of the LBT procedure is based on an intended uplink (UL) transmission to which the LBT procedure is related aligning with a boundary of the u-FFP.

Example 18 includes the method of any of examples 16-17, and/or some other example herein, wherein the notifying the higher layer includes notifying the higher layer about failure of the LBT procedure related to an uplink (UL) transmission that aligns with a boundary of the u-FFP.

Example 19 includes the method of any of examples 16-18, and/or some other example herein, wherein the notifying includes notifying the higher layer about failure of the LBT procedure related to a plurality of uplink (UL) transmissions within the u-FFP.

Example 20 includes the method of example 19, and/or some other example herein, wherein the plurality of UL transmissions does not include a UL transmission that overlaps with an idle period of the UE.

Example 21 includes the method of any of examples 16-20, and/or some other example herein, wherein the UE is to operate as an initiating device.

Example 22 includes the method of any of examples 16-21, and/or some other example herein, wherein the notifying includes an indication of a number of times the LBT procedure has failed.

Example Z01 may include an apparatus comprising means to perform one or more elements of a method described in or related to any of examples 1-22, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-22, or any other method or process described herein.

Example Z03 may include an apparatus comprising logic, modules, or circuitry to perform one or more elements of a method described in or related to any of examples 1-22, or any other method or process described herein.

Example Z04 may include a method, technique, or process as described in or related to any of examples 1-22, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-22, or portions thereof.

Example Z06 may include a signal as described in or related to any of examples 1-22, or portions or parts thereof.

Example Z07 may include a datagram, packet, frame, segment, protocol data unit (PDU), or message as described in or related to any of examples 1-22, or portions or parts thereof, or otherwise described in the present disclosure.

Example Z08 may include a signal encoded with data as described in or related to any of examples 1-22, or portions or parts thereof, or otherwise described in the present disclosure.

Example Z09 may include a signal encoded with a datagram, packet, frame, segment, protocol data unit (PDU), or message as described in or related to any of examples 1-22, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-22, or portions thereof.

Example Z11 may include a computer program comprising instructions, wherein execution of the program by a processing element is to cause the processing element to carry out the method, techniques, or process as described in or related to any of examples 1-22, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital Expenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense MultipleAccess |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |

-continued

| | |
|---|---|
| eNB | evolved NodeB, E-UTRAN Node B |
| EN-DC | E-UTRA-NR Dual Connectivity |
| EPC | Evolved Packet Core |
| EPDCCH enhanced PDCCH, | enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation feLAA further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-UGPRS | Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |

-continued

| | |
|---|---|
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |

| | |
|---|---|
| MAC-A | MAC used for authentication and key agreement (TSG T WG3 context) |
| MAC-IMAC | used for data integrity of signalling messages (TSGT WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH MTC | Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, MobileTermination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular PP, PTP Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |

| | |
|---|---|
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time Rx Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block SSBRI SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |

-continued

| | |
|---|---|
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, VLAN Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | extensible Markup Language |
| XRES | EXpected user RESponse |
| XOR | exclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. A user equipment (UE) comprising:
one or more processors; and
one or more non-transitory computer-readable media comprising instructions that, upon execution of the instructions by the one or more processors, are to cause the UE to:
identify that the UE is to transmit a configured grant (CG) uplink (UL) transmission when operating in an unlicensed spectrum;
identify one or more channel occupancy time (COT) assumptions related to the CG UL transmission;
identify whether to validate the one or more COT assumptions based on one or more factors related to the cellular network; and
validate or not validate, based on the identifying, the one or more COT assumptions.

2. The UE of claim 1, wherein the one or more COT assumptions are based on a downlink control information (DCI).

3. The UE of claim 1, wherein the one or more factors related to the cellular network include an identification that the UL transmission and an indication of the one or more COT assumptions are within a same g-fixed frame period (FFP).

4. The UE of claim 1, wherein the one or more factors related to the cellular network is based on a resource block (RB) set to which the UL transmission is confined.

5. The UE of claim 1, wherein the one or more factors related to the cellular network include an indication from a base station that the UE is to operate as a responding device.

6. The UE of claim 1, wherein the one or more factors related to the cellular network include an indication from a base station that the UE is to operate as an initiating device.

7. A user equipment (UE) comprising:
one or more processors; and
one or more non-transitory computer-readable media comprising instructions that, upon execution of the instructions by the one or more processors, are to cause the UE to:
identify that a failure of a listen-before-talk (LBT) procedure is related to alignment with a u-FFP; and
notify, based on the identification, a higher layer about the failure of the LBT procedure.

8. The UE of claim 7, wherein the failure of the LBT procedure is based on an intended uplink (UL) transmission to which the LBT procedure is related aligning with a boundary of the u-FFP.

9. The UE of claim 7, wherein notification to the higher layer includes a notification about failure of the LBT procedure related to an uplink (UL) transmission that aligns with a boundary of the u-FFP.

10. The UE of claim 7, wherein notification to the higher layer includes a notification about failure of the LBT procedure related to a plurality of uplink (UL) transmissions within the u-FFP.

11. The UE of claim 10, wherein the plurality of UL transmissions does not include a UL transmission that overlaps with an idle period of the UE.

12. The UE of claim 7, wherein the UE is to operate as an initiating device.

13. The UE of claim 7, wherein notification to the higher layer includes an indication of a number of times the LBT procedure has failed.

14. One or more non-transitory computer-readable media (NTCRM) comprising instructions that, upon execution of the instructions by the one or more processors of a user equipment (UE), are to cause the UE to:
identify that a failure of a listen-before-talk (LBT) procedure is related to alignment with a u-FFP; and
notify, based on the identification, a higher layer about the failure of the LBT procedure.

15. The one or more NTCRM of claim 14, wherein the failure of the LBT procedure is based on an intended uplink (UL) transmission to which the LBT procedure is related aligning with a boundary of the u-FFP.

16. The one or more NTCRM of claim 14, wherein notification to the higher layer includes a notification about failure of the LBT procedure related to an uplink (UL) transmission that aligns with a boundary of the u-FFP.

17. The one or more NTCRM of claim 14, wherein notification to the higher layer includes a notification about failure of the LBT procedure related to a plurality of uplink (UL) transmissions within the u-FFP.

18. The one or more NTCRM of claim 17, wherein the plurality of UL transmissions does not include a UL transmission that overlaps with an idle period of the UE.

19. The one or more NTCRM of claim 14, wherein the UE is to operate as an initiating device.

20. The one or more NTCRM of claim 14, wherein notification to the higher layer includes an indication of a number of times the LBT procedure has failed.

* * * * *